United States Patent [19]
Andermo

[11] Patent Number: 5,731,707
[45] Date of Patent: Mar. 24, 1998

[54] METHOD AND APPARATUS FOR SYNTHESIZING SPATIAL WAVEFORMS IN AN ELECTRONIC POSITION ENCODER

[75] Inventor: Nils Ingvar Andermo, Kirkland, Wash.

[73] Assignee: Mitutoyo Corporation, Kawasaki, Japan

[21] Appl. No.: 634,095

[22] Filed: Apr. 17, 1996

[51] Int. Cl.⁶ .................................................. G01R 27/26
[52] U.S. Cl. ........................................ 324/660; 324/662
[58] Field of Search ................................. 324/660, 661, 324/662, 690; 340/870.37; 341/15

[56] References Cited

U.S. PATENT DOCUMENTS

| Re. 34,741 | 9/1994  | Andermo  | 324/690 |
|------------|---------|----------|---------|
| 3,857,092  | 12/1974 | Meyer    | 324/662 |
| 4,420,754  | 12/1983 | Andermo  | 324/660 |
| 4,437,055  | 3/1984  | Meyer    | 324/725 |
| 4,449,179  | 5/1984  | Meyer    | 324/725 |
| 4,743,902  | 5/1988  | Andermo  | 324/660 |
| 4,841,225  | 6/1989  | Meyer    | 324/660 |
| 4,878,013  | 10/1989 | Andermo  | 324/690 |
| 4,879,508  | 11/1989 | Andermo  | 324/690 |
| 4,959,615  | 9/1990  | Andermo  | 324/690 |
| 5,022,559  | 6/1991  | Aandermo | 324/662 |
| 5,053,715  | 10/1991 | Andermo  | 324/662 |

FOREIGN PATENT DOCUMENTS 2 009 944   6/1979   United Kingdom .

*Primary Examiner*—Glenn W. Brown
*Attorney, Agent, or Firm*—Oliff & Berridge, P.L.C.

[57] ABSTRACT

A method and apparatus for synthesizing spatial waveforms in electronic position encoders allows the position of a composite spatial waveform applied to an electronic position transducer to be incremented by amounts less than the pitch of the electrodes of the electronic position transducer. The position of the composite spatial waveform is adjusted by applying several individual spatial waveforms to the electronic position transducer during a position measurement. The position of one or more individual spatial waveforms is altered by increments of the electrode pitch. As a result, a position of the composite spatial waveform resulting from the individual spatial waveforms is the average position of the individual spatial waveforms. In one embodiment, the composite spatial waveform is applied to the transmitter electrodes of an electronic position transducer. The position of the composite spatial waveform is adjusted so that the voltage from the electronic position transducer is minimized. In another embodiment, a plurality of pulses are applied to a single electrode of an electronic position transducer during a measurement. Each pulse generates a spatial waveform on a plurality of electrodes. The signals on the electrodes are summed after passing through a demodulating phase shifter. At least one of the spatial waveforms is shifted by a distance corresponding to the pitch of the electrodes, resulting in an average shift that is less than the pitch of the electrodes. The position of the composite spatial waveform is adjusted to minimize the sum of the voltages forming the composite waveform.

20 Claims, 17 Drawing Sheets

METHOD AND APPARATUS FOR SYNTHESIZING SPATIAL WAVEFORMS IN AN ELECTRONIC POSITION ENCODER

BACKGROUND OF THE INVENTION

1. Field of the Invention

This invention relates to a method and apparatus for synthesizing or filtering signals (a waveform) applied to or received from a plurality of electrodes of an electronic position encoder to adjust the spatial position of the waveform relative to the electrodes in increments that are significantly smaller than the pitch of the electrodes.

2. Description of Related Art

Capacitive position encoders have been developed and are used in a variety of fields. Examples of such capacitive position encoders are disclosed in U.S. Pat. No. 3,857,092 to Meyer, and U.S. Pat. Nos. 4,420,754, 4,878,013, 4,879,508 and 5,023,559 to Andermo, herein incorporated by reference. The capacitive position encoders described in the '754 patent to Andermo uses a slide slidably mounted on an elongated stationary scale. The slide is mounted on the scale so that it is movable along the length of the scale. The slide and scale are mechanically coupled to position measuring members, such as caliper jaws, so that the relative position between the position measuring members corresponds to the position of the slide on the scale.

The scale and the slide each contain an array of electrodes extending along the length of the scale and slide, respectively. The slide, for example, contains several sets of transmitter electrodes. Correspondingly positioned transmitter electrodes in each set, are connected to each other. Voltages corresponding to each of several phases of a periodic signal, such as a sine wave or a square wave, are coupled to corresponding transmitter electrodes in each set, which can be formed on either the slide or scale.

For example, 80 transmitter electrodes can be formed on the slide and divided into five subsets. Each subset thus contains 16 electrodes. Voltage signals having magnitudes of $V_0 \sin(N2\pi/16)$, where $N=1, 2, 3 \ldots, 16$, are supplied to the transmitter electrodes. In particular, the Nth electrode in each set receives the same voltage signal. Thus, for example, a voltage of $0.707V_0$ is applied to the second transmitter electrodes of each set (transmitter electrodes 2, 18, 34, 50 and 66). Alternatively, a first voltage signal may be supplied to the first m transmitter electrodes in each set of 16 and a second voltage can be supplied to the remaining 16-m transmitter electrodes in each set. A square wave is thus placed on the transmitter electrodes.

The voltage signals supplied to the sets of transmitter electrodes create a "spatial waveform". That is, the electrical waveform extends over the space occupied by each set of transmitter electrodes. The distance between corresponding points on adjacent transmitter electrodes is the "spatial pitch" of the electrodes. The distance between corresponding transmitter electrodes in adjacent sets is the "spatial wavelength" of the transmitter electrodes. The spatial waveform has a position or phase relative to the sets of transmitter electrodes based on the electrode position to which each of the voltage signals are supplied.

For example, in the square wave example outlined above, the phase of the spatial waveform is defined as 0° when the first eight electrodes in each set receive the first voltage and the second eight electrodes receive the second voltage. The phase of the spatial waveform can be shifted to 22.5° by placing the first voltage on the transmitter electrodes 2–9 in each set, and placing the second voltage on the transmitter electrodes 1 and 10–16 of each set.

However, the number of transmitter electrodes in each set defines the smallest angular phase increment over which the spatial waveform can be shifted. Similarly, the pitch of the transmitter electrodes defines the smallest positional increment over which the spatial waveform can be shifted. Thus, the smallest phase angle over which the spatial waveform can be shifted is 22.5° in the example outlined above. More generally, the smallest phase angle is 360°/N, where N is the number of transmitter electrodes in each set.

After the voltage signals are supplied to the transmitter electrodes, the voltage signals are capacitively coupled to first receiver electrodes on the scale. Second transmitter electrodes are electrically connected to the first receiver electrodes. Thus, the voltage signals capacitively coupled to the first receiver electrodes are supplied to the second transmitter electrodes. The voltage signals supplied to the second transmitter electrodes are then capacitively coupled back to one or more second receiver electrodes on the slide.

The electrodes on the scale are configured to alter the magnitudes of the voltage signals received from the transmitter electrodes on the slide (or to shift the phase of the spatial waveform) based on the position of the slide relative to the scale. The magnitude of the combined voltage signals received by the second receiver electrodes on the slide (or the magnitude of the phase shift) thus indicates the relative position between the slide and the scale.

Appropriate electronics connected to the second receiver electrodes and the signal source for the voltage signals supplied to the first transmitter electrodes determines the magnitude of the combined received voltage signals and thus the position of the slide on the scale. The signal source for the first transmitter electrodes may shift the phase of the spatial waveform supplied to the sets of the first transmitter electrodes as appropriate as the slide moves along the scale.

The arrangement of the electrodes on the slide and scale may be reversed so that the first transmitter electrodes and second receiver electrodes are mounted on the scale and the first receiver electrodes and second transmitter electrodes are mounted on the slide.

Assuming a given degree of analog signal interpolation, the distance-measuring resolution of the prior art capacitive position encoders which incrementally shift the spatial phase of the supplied spatial waveform is a function of the density and the pitch of the transmitter electrodes in each set over which the spatial waveform extends. Placing thinner transmitter electrodes closer together results in a higher measuring resolution since the incremental spatial phase shift occurs over a shorter distance. For example, increasing the number of transmitter electrodes in a spatial wavelength of 1" from 8 electrodes to 16 electrodes decreases the "selectable" angular phase shift over a distance of one electrode pitch from 45° to 22.5° and halves the minimum selectable spatial increment. Alternatively, holding the number of transmitter electrodes in a spatial wavelength constant, for example at 16, and decreasing the spatial wavelength from 1" to ½" decreases the distance over which a phase shift of 22.5° occurs from ⅛ to 1/16.

However, there is a limit to how small the pitch of the electrodes can be made, thus limiting the resolution of capacitive position encoders. If the selectable angular phase shift between adjacent electrodes could be made smaller than $2\pi/N$ (or 360°/N), where N is the number of electrodes in a spatial wavelength, then the resolution of the capacitive encoder can be improved. In particular, the resolution can be improved without decreasing the pitch of the electrodes or increasing the degree of analog signal interpolation.

In the prior art capacitive position encoders, the smallest purely digital spatial phase increment is limited to the pitch of the transmitter electrodes. However, encoders which achieve increments of less than the pitch of the transmitter electrodes using analog input signals are well known in the art. For example, U.S. Pat. No. 4,420,754 to Andermo describes two distinct solutions using analog input signals to permit positional determinations with a resolution finer than the pitch of the transmitting electrodes.

The first solution is to apply sinusoidal signals to the transmitter electrodes. In addition, the transmitter electrodes are themselves sinusoidally shaped. The temporal phase shift of the output signal relative to the input signal is then measured by analog techniques. However, this approach requires a rather precise analog interpolation circuit when the ratio is high between the pitch of the transmitter electrodes and the desired position resolution to be obtained. As a result, to achieve the necessary degree of spatial interpolation, this approach requires relatively sensitive and expensive analog circuitry, such as high accuracy analog-to-digital converters.

The second solution disclosed in the '754 patent applies uniform voltage pulses to the transmitter electrodes. The timing of the pulses is then adjusted using a temporal phase controller. This adjusts the phase of the spatial waveform applied to the transmitter electrodes. As a result, the temporal phase of the total signal capacitively coupled to the second receiver electrodes has a predetermined temporal phase, such as 0 degrees. The temporal phase controller can alter the temporal phase of the transmitted signal in increments that are less than the spatial phase shift increments between adjacent electrodes. Thus, the magnitude of the phase adjustment needed to maintain the zero phase shift at the receiver electrodes indicates the relative position between the slide and scale with a high resolution.

U.S. Pat. No. 4,841,225 to Meyer discloses an approach for digitally selecting the phase of a spatial waveform to shift it by increments that are smaller than the pitch of the transmitting electrodes. In the '225 patent, rather than supplying the same voltage signals to the correspondingly positioned transmitter electrodes in every set, the '225 patent supplies differing voltage signals to the corresponding transmitter electrodes in some of the sets. The phase of the spatial waveform supplied to one set of transmitter electrodes varies from the phase of the spatial waveform applied to another set of transmitter electrodes.

By supplying spatial waveforms having different phases to different sets of the transmitter electrodes, the phases of the spatial waveforms supplied to each set of the transmitter electrodes are spatially averaged by the transducer. If voltage signals having a given spatial phase shift are supplied to just one set of transmitter electrodes, the average spatial shift is equal to that phase shift divided by the number of sets of transmitter electrodes.

Therefore, the averaged spatial waveform can be shifted by a distance of less than the pitch of the transmitter electrodes. The average phase shift is thus less than 360°/N, where N is the number of transmitting electrodes in each set. More generally, given M sets of N transmitting electrodes, shifting the spatial phase in one group by a number P of pitches having a width $P_t$ results in a displacement of the spatial waveform within an incremental phase shift by $P_t*P/M$. However, to individually supply a different voltage signal to each transmitter electrode, the capacitive position encoder of the '225 patent requires a large number of switch connections.

The relatively low-cost printed circuit board encoder technology is most commonly employed to fabricate the capacitive electronic position encoders. The large number of switches (i.e., M sets×N switches per set) and the required length of the substrate containing the transmitter electrodes make the approach of the '225 patent physically and economically difficult to implement using the printed circuit board encoder technology. The large number of required switches can be fabricated using integrated circuit production techniques for the electrode array switching network. However, this is not a desirable fabrication technique in many cases.

U.S. Pat. No. 4,878,013 to Andermo discloses another approach for digitally selecting spatial phase increments of less than the physical pitch of the transmitter electrodes. The '013 patent combines a specific spacing of the transmitter and receiver electrodes with a specific corresponding relation for the driving signals supplied to the transmitter electrodes to select increments of resolution smaller than the physical pitch of the transmitter electrodes. A "synthetic" spatial pitch is created by the multiple sets of transmitter electrodes and the properly spaced scale electrodes. The effective synthetic spatial pitch of the transmitter electrodes in the '013 patent is effectively significantly smaller than the actual physical pitch. The increments over which the spatial waveform signals can be digitally shifted are thus correspondingly smaller. However, this a geometric rather than an electronic solution to the problem.

SUMMARY OF THE INVENTION

This invention provides a method and apparatus for digitally manipulating the spatial waveform of an electrode based position encoder to create an effective spatial waveform resolution that is smaller than the pitch of the electrodes.

This invention also provides a capacitive position encoder having an effective resolution of less than the pitch of the transmitter electrodes that does not require a large number of switches.

This invention further provides a capacitive position encoder having an effective resolution of less than the pitch of the transmitter electrodes using a relatively small number of sets of transmitter electrodes.

The claimed system synthesizes spatial waveforms for incremental or absolute capacitive position encoders. These encoders have a first substrate and a second substrate which are movable relative to each other along a measurement axis. Transmitter electrodes are formed on the first substrate. Voltage signals supplied to the transmitter electrodes create a spatial waveform. At least one other electrode is formed on the first substrate. The at least one other electrode is capacitively coupled to the transmitter electrodes through electrodes on the second substrate. The magnitudes of the alterations (in either amplitude or phase) of the voltage signals transferred between the transmitter electrodes and the at least one other electrode depends on the relative position between the first and second substrates along the measurement axis.

To achieve a desired accuracy, the voltage signals which propagated through the transducer have a spatially continuous and periodic structure, such as a square wave, or, preferably, a sine wave. This continuous and periodic wave structure is provided by supplying a plurality of constituent digital spatial waveforms to the encoder for each position measurement. This creates a composite spatial waveform having a spatial phase corresponding to the phase of the spatial summation of the constituent digital spatial waveforms supplied to the encoder.

In operation, the system first determines the magnitude of the signal received by the receiving electrode on the slide. The system then selects the appropriate constituent digital spatial waveforms to adjust the spatial phase of the received composite spatial waveform to obtain a predetermined output value. The system adjusts the spatial phase of the received composite spatial waveform by altering at least some of the constituent digital spatial waveforms.

In normal operation, the transducer system repetitively performs the above-described operation so that the predetermined output value is maintained within a desired margin. During this normal operation, based on the unique configuration of the constituent digital spatial waveforms selected to maintain the predetermined output value, the system determines the relative position of the first and second substrates along the measurement axis within one increment of the scale wavelength. To determine the relative position between the first and second substrates along the measurement axis, the system repetitively performs the above-described operation while accumulating the net number of scale wavelength increments moved.

The system either supplies a respective voltage to or receives a respective voltage from each electrode in the array for each spatial waveform. Thus, for each position measurement, a plurality of voltage signals are supplied to the transmitter electrodes at a plurality of times. If the system supplies the same voltage signal to each electrode in each set, the system preferably modulates, for each time, the pulses with a corresponding plurality of coefficients. Further, each of the plurality of coefficients corresponds to an electrode in each of the sets of electrodes. As a result, a plurality of modulated pulses are supplied to each electrode during each of the measurements. Each set of modulated pulses forms a spatial waveform having a spatial configuration corresponding to the sets of the coefficients. If different voltage signals are supplied to each of the transmitter electrodes, the effective spatial phase may be determined from the composite spatial waveform.

The electronic position encoder can be generated in reverse. The at least one other electrode thus transmits the waveform and the transmitter electrodes receive the waveform. When the voltage signals are instead received by the transmitter electrodes, a plurality of pulses are supplied to the at least one other electrode during each measurement. The system preferably controls the presence of a connection and a connection polarity for each set of transmitter electrodes during the plurality of pulses with a corresponding plurality of sets of coefficients. Each coefficient in a set corresponds to a transmitter electrode in each set. Each set of pulses is therefore spatially modulated and filtered by a selectable spatial filter having a spatial configuration determined by the set of coefficients. As a result, a plurality of pulses are modulated and filtered through each of the sets of electrodes for each of the measurements.

These and other features and advantages of this invention are described in or apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF THE INVENTION

Figure 1:
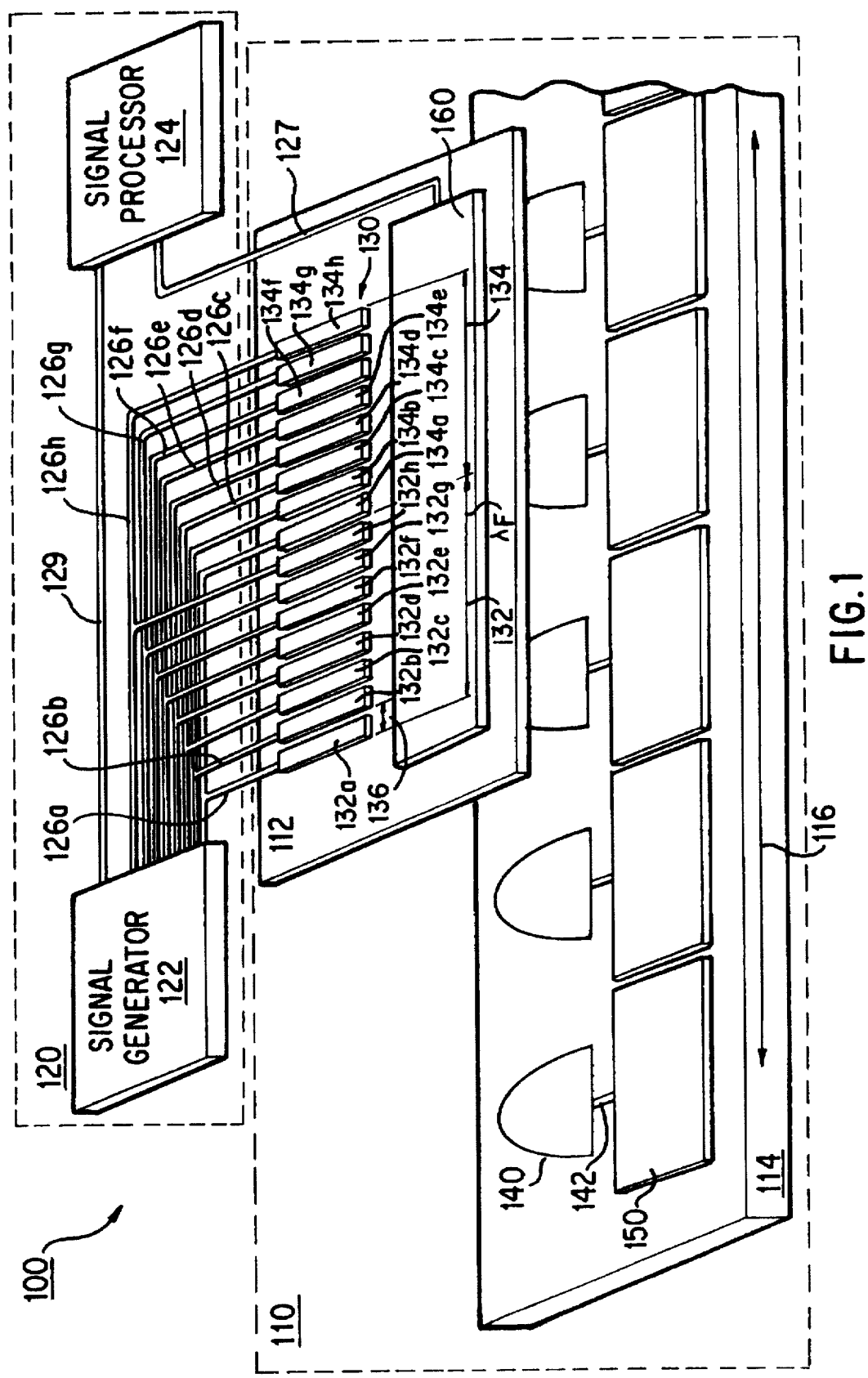
FIG. 1 shows a preferred embodiment of a capacitive position encoder used with the spatial waveform synthesizing system of this invention.

In the preferred embodiment, the method for synthesizing spatial waveforms using an array of electrodes of this invention is applied to a capacitive position encoder, such as the one shown in FIG. 1 As shown in FIG. 1, the encoder 100 includes a capacitive position transducer 110 essentially corresponding to FIG. 1 of U.S. Pat. No. 4,878,013.

The transducer 110 includes a slide 112 positioned adjacent to a scale 114. The slide 112 moves relative to the scale 114 along a measurement axis 116. The capacitive position encoder 100 also includes an electronic circuit 120. The electronic circuit 120 includes a signal generator 122 and a signal processor 124.

An array of first transmitter electrodes 130 is mounted on the slide 112. As shown in FIG. 1, two sets 132 and 134 of the first transmitter electrodes 130 are mounted on the slide 112. However, it should be appreciated that any number of sets of the transmitter electrodes 130 could be used.

The transmitter electrodes 130 are connected to the signal generator 122. In particular, the first transmitter electrode 132a in the first set 132 and the first transmitter electrode 134a in the second set 134 are each connected to the same output of the signal generator 122. Similarly, each of the second, etc. electrodes 132b–132h of the first set 132 and the second, etc. electrodes 132b–132h of the second set 134 are connected to the same signal output lines 126b–126h, respectively of the signal generator 122.

The distance between the left edge of the first transmitter electrode 132a of the first set 132 and the left edge of the first transmitter electrode 134a in the second set 134 is the spatial wavelength of the array of the transmitter electrodes 130. The pitch 136 of the transmitter electrodes 130 is the distance between any point on any transmitter electrode 130 and the corresponding point on an adjacent transmitter electrode 130.

The slide 112 is positioned close to the scale 114 so that the signals applied to the first transmitter electrodes 130 are capacitively coupled to first receiver electrodes 140, which are arranged in an array on the scale 114. Each of the receiver electrodes 140 is connected to a second transmitter electrode 150 by a connection wire 142. The second transmitter electrodes 150 are also arranged in an array. The voltage signals capacitively coupled onto the first receiver electrodes 140 are supplied by the connecting wires 142 to the second transmitter electrodes 150. The voltage signals supplied to the second transmitter electrodes 150 are capacitively coupled to a second receiver electrode 160 mounted on the slide 112. The second receiver electrode 160 is connected to the signal processor 124. The voltage signal received by the second receiver electrode is a function of the position of the slide 112 relative to the scale 114.

Each first electrode 132a and 134a of each set 132 and 134 is connected to the signal generator 122 by the signal line 126a. Similarly, each second-eighth electrodes 132b–132h of the first set 132 is connected to the signal generator 122 by the signal lines 126b–126h, respectively. Likewise, each second-eighth electrode 134b–134h of the second set is also connected to the signal generator 122 by the signal lines 126b–126h, respectively. The second receiver electrode 160 is connected to the signal processor 124 by the signal line 127. The signal generator 122 and the signal processor 124 are connected to each other by the signal line(s) 129.

Voltage signals corresponding to a periodic waveform are supplied to the electrodes 130 in the first and second sets 132 and 134 from the signal generator 122. For example, if the periodic waveform is a square wave, the first four transmitter electrodes 132a–132d and 134a–134d in the first and second sets 132 and 134 receive the same first voltage signal (e.g., a +5 volt signal). The other four electrodes 132e–132h and 134e–134h in the first and second sets 132 and 134 receive the same second voltage (e.g., a −5 volt signal). Thus, instead of being a periodic waveform in time, the periodic waveform is spatially distributed along the measuring axis 116. Thus, the periodic waveform is a "spatial waveform."

The phase of this spatial waveform can be incrementally shifted by altering the position within each of the first and second sets 132 and 134 at which the voltage signals shifts from the first voltage (+5V) to the second voltage (−5V).

Thus, the position of the spatial waveform will be shifted by the pitch 136 from the example outlined above by supplying the first voltage (+5V) to the second through fifth transmitter electrodes 132b–132e and 134b–134e in the first and second sets 132 and 134. At the same time, the second voltage (−5V) is supplied to the first and sixth through eighth transmitter electrodes 132a and 132f–132h, and 134a and 134f–h, in the first and second sets 132 and 134. A position shift of one pitch 136 corresponds to a spatial phase shift of 45°. That is, the phase shifts 360°/N, where N is the number of transmitter electrodes in each set. Since, in the example outlined above, each of the first and second sets 132 and 134 have eight transmitter electrode 130, the phase shift is 360°/8, or 45°.

In operation, the amplitude of the voltage signal received by the second receiver electrode 160 is a function both of the relative position between the slide 112 and the scale 114 and the spatial waveform of the signals placed on the first transmitter electrodes 130. The voltage signal received by the second receiver electrode 160 is the sum of all of the voltage signals coupled from the first transmitter electrodes 130 through the first receiver electrodes 140 and the second transmitter electrodes 150.

For a given relative position between the slide 112 and the scale 114, the second receiver electrode 160 will receive a signal having an amplitude of zero volts when complementary voltages are applied to the proper ones of the transmitter electrodes 130 which are coupled to the first receiver electrodes 140 to the same degree. As the slide 112 then moves along the scale 114, the geometric relationship between the transmitter electrodes 130 and the receiver electrodes 140 changes. Thus, the capacitive coupling to those transmitter electrodes 130 supplied with the voltage signals having one polarity becomes greater than the capacitive coupling to those transmitter electrodes 130 supplied with the voltage signals having the other polarity. Accordingly, the voltage signal on the second receiver electrode 160 will be either a positive or a negative voltage signal, depending upon the direction that the slide 112 has moved relative to the scale 114.

As the slide 112 moves relative to the scale 114, the signal generator 122 increments the position of the spatial waveform supplied to the transmitter electrodes 130 relative to the first transmitter electrodes 132a–132h and 134a–134h of the sets 132 and 134 to keep the voltage signal received by the second receiver electrode 160 at an amplitude of substantially zero volts. The position of the spatial waveform relative to the first transmitter electrodes 132a–132h and 134a–134h of the sets 132 and 134 thus corresponds to the relative position of the transducer elements on the slide 112 and the scale 114. By using the position of the spatial waveform relative to the transmitter electrodes of the sets 132 and 134, the signal processor 124 determines the relative position of the slide 112 on the scale 114 along the measurement axis 116 within a distance equal to the scale wavelength $\lambda_F$ divided by the number of transmitter electrodes, or phases, N.

The electronic circuit 120 performs the above described operation while accumulating the net number of distances $\lambda_F/N$ moved to determine the position of the slide 112 on the scale 114. However, assuming that the spatial waveform is continuous and periodic, that the electronic circuit is a conventional digital type system having only two possible voltage signal inputs (e.g., the +5V and −5V signals used in the example outlined above), and that only one spatial waveform is used in each measurement cycle, the position of the spatial waveform supplied to the transmitter electrodes 130 can be shifted only in increments equal to the distance $\lambda_F/N$. Thus, the digital resolution of the encoder 100 shown in FIG. 1 is fundamentally limited by $(\lambda_F/N)$ when the transducer 110 is connected to a conventional electronic circuit 120.

The preferred embodiment of the spatial waveform synthesizing method of this invention is able to achieve digital resolutions of less than the pitch 136 of the transmitter electrodes 130 by basing each position measurement on a plurality of spatial waveforms supplied to the transmitter electrodes 130 during each measurement cycle. The configuration of at least one of the spatial waveforms supplied to the transmitter electrodes 130 during each measurement cycle can be (but need not be) different from the configuration of the other spatial waveforms supplied to the transmitter electrodes 130 during the same measurement cycle. The position of the composite spatial waveform formed by the sum of all of the spatial waveforms supplied to the transmitter electrodes 130 during one measurement cycle is thus the position of the spatial accumulation of all of the constituent spatial waveforms supplied to the transmitter electrodes 130.

For example, a measurement cycle includes four constituent spatial waveforms. If the position of exactly one constituent spatial waveform is shifted relative to the other constituent waveforms by the pitch 136 of the transmitter electrodes 130, then the position of the composite spatial waveform accumulated over all four measurement subcycles is shifted one-quarter of the pitch 136 relative to a reference composite spatial waveform formed by repeatedly using a single constituent waveform.

Thus, by altering the position of at least one of the constituent spatial waveforms, the position of the composite spatial waveform accumulated over all of the waveforms comprising a measurement cycle will be shifted a fraction of the pitch 136 of the transmitter electrodes 130 relative to the reference composite spatial waveform. The ability to effectively alter the position of the composite spatial waveform in increments of less than the pitch 136 of the transmitter electrodes 130 allows a correspondingly finer measurement resolution to be achieved using low-cost and accurate digital means.

Figure 2A:
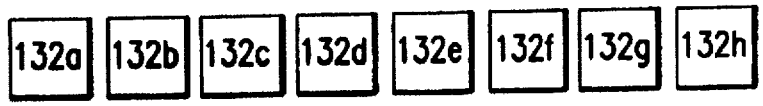
FIGS. 2A–2G are voltage and waveform diagrams showing a first arrangement for supplying voltage signals to the transmitter electrodes in each set of the capacitive position encoder of FIG. 1.
Figure 2B:
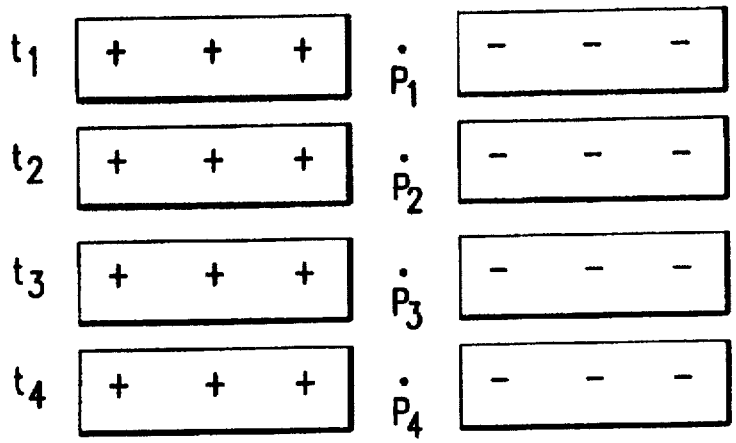

FIG. 2A schematically shows the electrodes $132a$–$132h$ of the first set 132 of the first transmitter electrodes 130. FIG. 2B shows the relative voltage amplitudes of the voltage signals applied to the electrodes $132a$–$132h$ to form four constituent digital spatial waveforms at four different times $t_1$–$t_4$. At time $t_1$, the first three electrodes $132a$–$132c$ are supplied with a voltage signal having a first polarity (e.g., +5V). At the same time, the electrodes $132e$–$132g$ are supplied with a voltage signal having the same magnitude but the opposite polarity (e.g., −5V).

Placing a positive voltage on the electrodes $132a$–$132c$ effectively forms a single positive electrode extending from the left edge of electrode $132a$ to the right edge of electrode $132c$ (disregarding the spacing between the electrodes 130). Similarly, placing a negative voltage on the electrodes $132e$–$132g$ effectively forms a single electrode extending from the left edge of the electrode $132e$ to the right edge of the electrode $132g$. For each of the constituent spatial waveforms shown in FIG. 2B, the center or centroid of each constituent spatial waveform (representing the spatial phase or spatial position) will be at $P_1$–$P_4$, respectively. In particular, for the constituent spatial waveforms shown in FIG. 2B, each of the centroids $P_1$–$P_4$ is at the mid-point of the electrode $132d$.

Figure 2C:
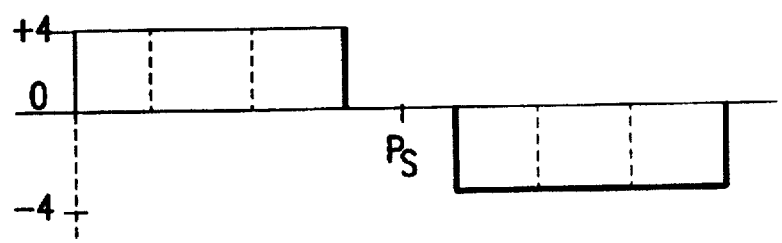

FIG. 2C shows the resulting composite spatial waveform resulting from the sum of the voltages placed on the electrodes $132a$–$132h$ during the four times $t_1$–$t_4$. As shown in FIG. 2C, the composite waveform has an amplitude of +4 units (i.e., +4 times the voltage placed on the electrodes $132a$–$132c$) in the range occupied by the electrodes $132a$–$132c$, an amplitude of zero volts in the range occupied by the electrode $132d$, an amplitude of −4 units in the range occupied by electrodes $132e$–$132g$, and an amplitude of zero volts in the range occupied by the electrode $132h$.

The center or centroid of the composite spatial waveform (representing the spatial phase or spatial position) will be at $P_s$. $P_s$ is at the same position as the centroids $P_1$–$P_4$ of the four identical constituent spatial waveforms, i.e., at the mid-point of the electrode $132d$.

The spatial waveform synthesizing method of this invention accumulates the constituent digital spatial waveforms placed on the electrodes $132a$–$132h$ during all four time periods $t_1$–$t_4$ to provide a position measurement output based on the position of the accumulated composite waveform. The accumulated composite waveform provides the same effect as placing the individual voltage signals shown in FIG. 2C for each of the electrodes $132a$–$132h$ on the corresponding first transmitter electrodes $132a$–$132h$ during a single time period. The composite waveform shown in FIG. 2C illustrates the position of the composite spatial waveform applied to the transmitter electrodes $132a$–$132h$ during the four times $t_1$–$t_4$.

Figure 2D:
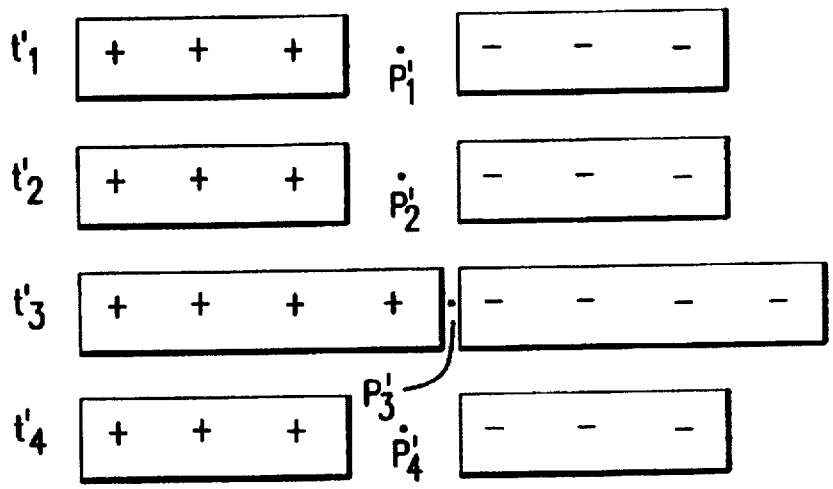

FIG. 2D shows another set of voltage signals placed on the transmitter electrodes $132a$–$132h$. As shown in FIG. 2D, the voltage signals placed on the electrodes $132a$–$132h$ during times $t'_1$, $t'_2$ and $t'_4$ are identical to the voltage signals placed on electrodes $132a$–$132h$ at times $t_1$, $t_2$ and $t_4$ shown in FIG. 2B. The locations of the centroids of the constituent spatial waveform at times $t'_1$, $t'_2$ and $t'_4$ are at $P'_1$, $P'_2$ and $P'_4$, the midpoints of the electrode $132d$.

However, at time $t'_3$, the positive voltage signal is also placed on the electrode $132d$, and the negative voltage signal is also placed on the electrode $132h$. As a result, the centroid of the constituent spatial waveform supplied at time $t'_3$ is shifted to the right by half the pitch 136 of the electrodes 130 and therefore lies at $P'_3$. The constituent waveforms can be freely altered, a freedom that the transducing system will not allow with the composite waveform.

Figure 2E:
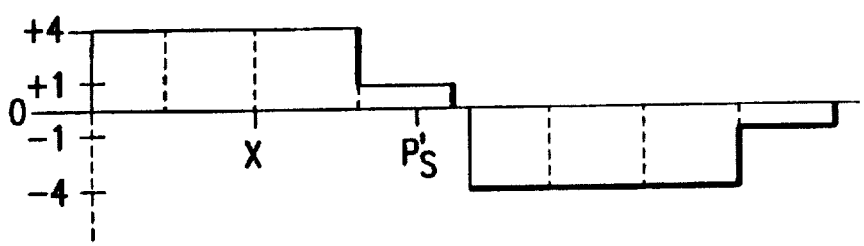

In general, system accuracy requires that the composite waveform have a nearly constant shape at all positions, that it is spatially continuous and periodic, and that it is preferably sinusoidal. The constituent waveforms individually do not provide, or need to have, these desirable characteristics. Thus, their positional behavior provides only a rough substitute or alternative to the inventive method for position control of the composite waveform. FIG. 2E shows the sum of the voltages placed on the electrodes $132a$–$132h$ during the four times $t'_1$–$t'_4$ (the composite waveform).

As shown in FIG. 2E, the composite waveform has an amplitude of +4 units. This amplitude extends along the area occupied by the electrodes $132a$–$132c$ because these electrodes received a single unit positive voltage signal during each of the four times $t_{1-4}$. However, the portion of the spatial waveform occupied by the electrode $132d$ received a positive unit voltage signal only during the time $t'_3$. Thus, this portion of the composite waveform has an amplitude of +1.

Similarly, the portion of the composite spatial waveform which extends along the electrodes $132e$–$132g$ has an amplitude of −4 units. However, the portion of the composite spatial waveform extending along the electrode 132h received a negative unit voltage signal only during the time t'₃. Thus, this portion of the composite waveform has an amplitude of −1.

The shift in the centroid of the constituent spatial waveform from P'₁, P'₂ and P'₄ at times t'₁, t'₂, and t'₄, respectively, to P'₃ at time t'₃ shifts the centroid P'ₛ of the composite spatial waveform by less than the pitch 136 of the electrodes 130. Shifting the centroid of the constituent spatial waveform to the right at time t'₃ shifts the centroid P'ₛ of the composite spatial waveform to the right. The magnitude of the shift is a function of both the number of time periods t'₁–t'₄ during which the constituent spatial waveform is shifted as well as the size of each shift.

Figure 2F:
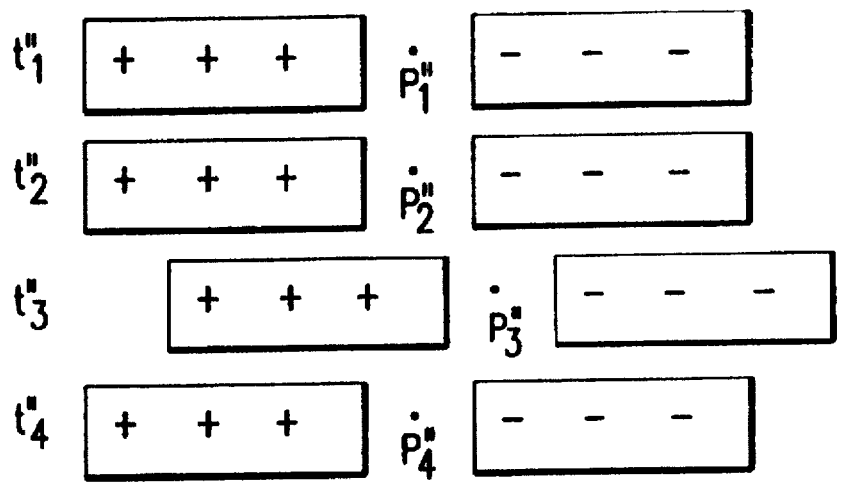
Figure 2G:
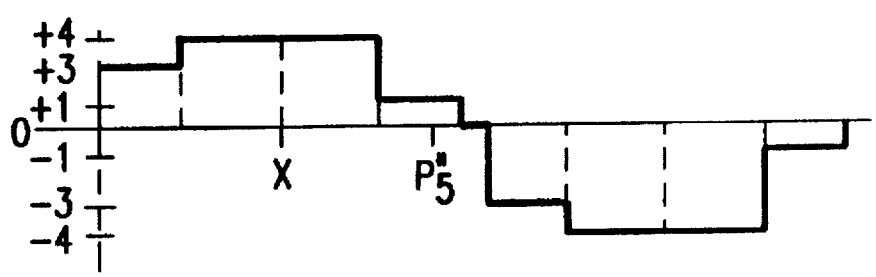

For example, if the electrodes 132a–132h receive the voltage signals shown in FIG. 2F at time t"₃, the centroid of that constituent spatial waveform is shifted by an entire pitch 136 to P"₃. The shift from P₃ to P"₃ is twice the shift from P₃ to P'₃. FIG. 2G show the sum of the voltage signals placed on the electrodes 132a–132h when the supplied voltage signals during time t"₃ are those shown in FIG. 2F. The centroid P"ₛ of the composite spatial waveform shown in FIG. 2G is positioned to the right of the centroid P'ₛ of the composite spatial waveform shown in FIG. 2E.

The reference point for all measurements for the positive portion is a point X midway between the electrodes 132b and 132c, as shown in FIGS. 2E and 2G. For the negative portion of the spatial waveform, the reference point is midway between the electrodes 132f and 132g.

The centroid Pₛ for the entire spatial waveform is a combination of the centroids of the positive and negative portions of the waveform. This centroid is determined from a reference point midway between the electrodes 132d and 132c. Thus, the reference point for the entire spatial waveform is at the same position as P'₃ in FIG. 2D. The centroid of the entire spatial waveform, such as the spatial waveform shown in FIG. 2E, can also be visualized as a combination of the centroids represented by P'₁–P'₄ shown in FIG. 2D.

Since the positive and negative portions of the spatial waveforms shown in FIGS. 2C, 2E and 2G are complementary, a shift in the centroid for the positive portion is matched by an equal shift in the same direction of the centroid for the negative portion and by an equal shift in the same direction for the centroid of the total combined waveform. Thus, for example, a calculated position of −1 for the centroid the positive portion of the waveform places that centroid midway between the electrodes 132a and 132b. The calculated position of the negative portion of the spatial waveform would also be −1, shifting that centroid from its reference point to a point midway between the electrodes 132e and 132f. Similarly, the calculated position of the centroid for the combined waveform shifts from its reference point to a point midway between the electrodes 132c and 132d.

To calculate the centroid of the positive portion of the spatial waveform, the contribution provided by each electrode is the product of the voltage amplitude on that electrode and the distance between the midpoint of that electrode and the reference point X. The sum of the individual contributions is then divided by the sum of the individual voltage amplitudes on the electrodes. Because, in this example, the reference point X is positioned between two adjacent electrodes, the distance between the mid-point of any electrode and the reference point X will be on the half pitch.

As shown in FIG. 2G, the center of the electrode 132a is located at a distance −1.5 pitches from the reference point X.

The sum of the voltage signals applied to electrode 132a during the four times t"₁–t"₄ is +3 units. The contribution provided by the electrode 132a is thus −4.5 (i.e., −1.5*3). Without explaining in detail the contribution provided by the electrodes 132b–132d, centroid of the positive portion of the spatial waveform shown in FIG. 2G is:

$$\frac{(-1.5*3) + (-.5*4) + (+.5*4) + (+1.5*1)}{12} =$$

$$\frac{(-4.5) + (-2) + (+2) + (1.5)}{12} = \frac{-3}{12} = -.25$$

The calculated shift for centroid P"ₛ is thus −0.25. This means the centroid P"ₛ is shifted is one-quarter of the pitch 136 of the electrodes 130 to the left of the reference point X. In contrast, the calculated shift for the centroid P'ₛ for the spatial waveform shown in FIG. 2C is −0.5. Thus, the centroid for the spatial waveform shown in FIG. 2G is positioned one-quarter of the pitch 136 to the right of the centroid for the spatial waveform shown in FIG. 2C.

Alternatively, the centroid of the spatial waveform shown in FIG. 2G is equal to the average of the centroids P₁"–P₄" of the spatial waveforms generated at times t₁"–t₄", as shown in FIG. 2F. Specifically, the centroid of each of the spatial waveforms for times t"₁, t₂ and t"₄ in FIG. 2F is at −0.5. The centroid of the spatial waveform for time t"₃ in FIG. 2F is +0.5. That is, the centroid for this spatial waveform, for the positive portion, is one-half of the pitch 136 to the right of the reference point X. Assuming the same number of voltage units (i.e., 3 "+" voltage units and 3 "−" voltage units in FIG. 2F) is used in each time period, the centroid of the composite spatial waveform is the sum of the four centroids for the individual spatial waveforms (−0.5*3+ 0.5=−1) divided by the number of centroids (4) or −0.25.

For this reason, the operation of the preferred embodiment of this invention can be visualized in a variety of manners. The individual spatial waveforms can be visualized as creating a composite spatial waveform having a position corresponding to the average of the positions of the individual spatial waveforms. Alternatively, the amplitudes of the voltage signals placed on each of the electrodes can be visualized as being summed to create the composite voltage waveforms shown in FIGS. 2C, 2E, and 2G, with the voltage waveforms creating a composite spatial waveform having a centroid position corresponding to the centroids of the voltage wave forms.

It should also be appreciated that different combinations of constituent voltage amplitudes placed on the first transmitting electrodes 130 can create the same composite spatial waveform. For example, the composite spatial waveform represented by the voltage waveform shown in FIG. 3C is identical to the spatial waveform shown in FIG. 4C. However, as shown in FIG. 4B, the spatial waveform shown in FIG. 4C is created by driving three electrodes with a positive polarity and three electrodes with a negative polarity, with the spatial waveform being shifted by the pitch 136 of the electrodes at t₃.

Figure 3A:
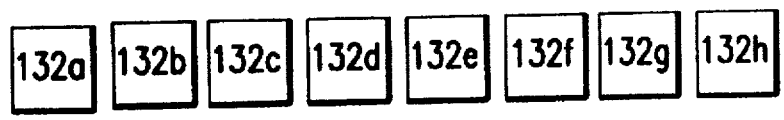
FIGS. 3A–3C are voltage and waveform diagrams showing a second arrangement for supplying the voltage signals to the transmitter electrodes in each set of the capacitive position encoder of FIG. 1.
Figure 3B:
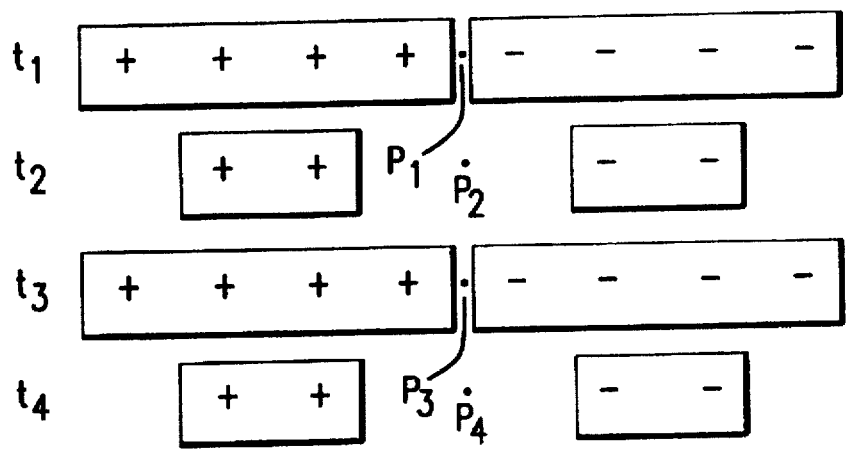
Figure 3C:
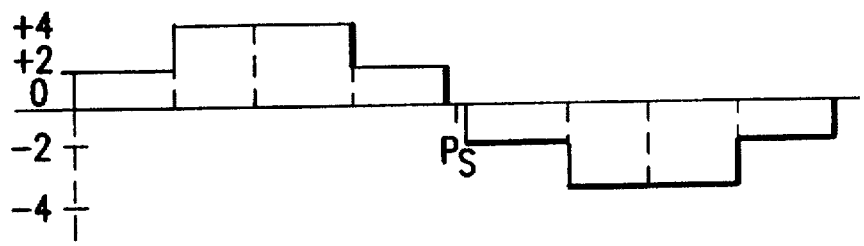
Figure 4A:
FIGS. 4A–4C are voltage and waveform diagrams showing a third arrangement for supplying the voltage signals to the transmitter electrodes in each set of the capacitive position encoder of FIG. 1.
Figure 4B:
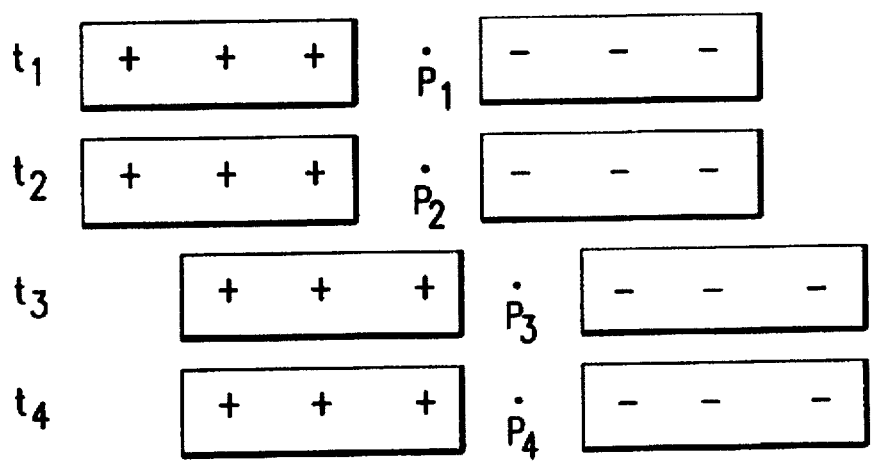
Figure 4C:
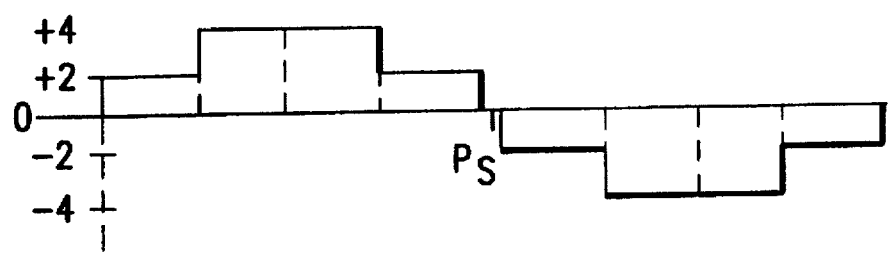

In contrast, as shown in FIG. 3B, the spatial waveform shown in FIG. 3C is created by driving all eight electrodes 132a–132h with complementary voltages at times t₁ and t₃, and only four of the electrodes 132a–132h at times t₂ and t₄. Nevertheless, the combination of the voltages shown in FIG. 3B produce the same composite spatial waveform as the combination of the voltages shown in FIG. 4B.

Figure 5A:
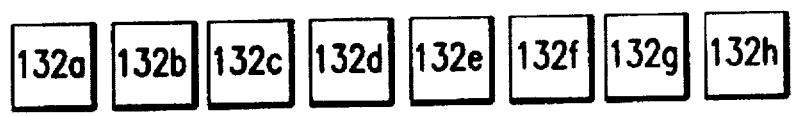
FIGS. 5A–5C are voltage and waveform diagrams showing a fourth arrangement for supplying the voltage signals to the transmitter electrodes in each set of the capacitive position encoder of FIG. 1.
Figure 5B:
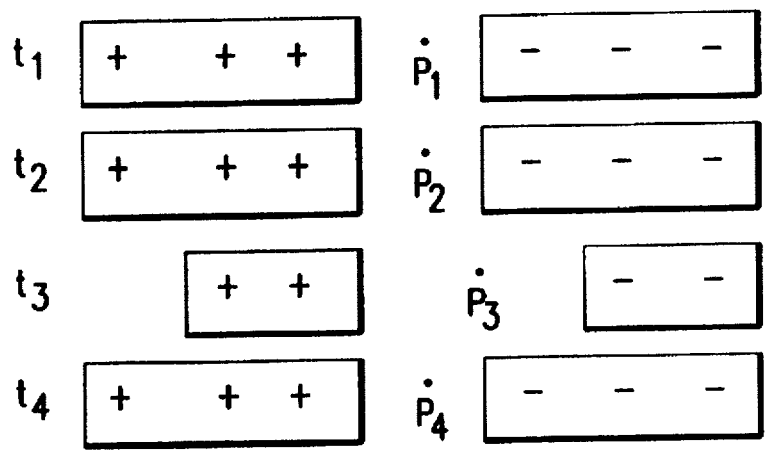
Figure 5C:
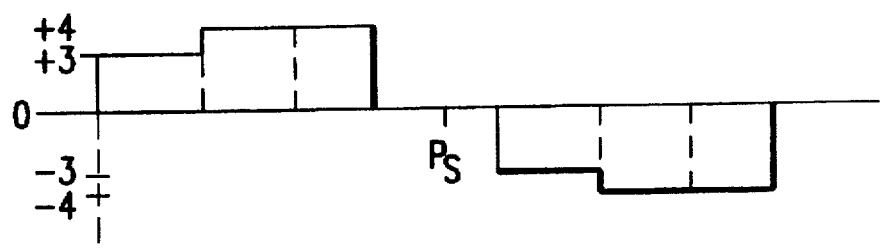

Finally, the shift in the position of the composite spatial waveform by a shift in the position of one spatial waveform is a function of not only the magnitude of that shift, but is also a function of the number of electrodes that are powered to create the shifted spatial waveform. With reference to FIGS. 5A–C, the spatial waveforms created at times $t_1$, $t_2$ and $t_4$ are identical to the spatial waveforms shown in FIG. 2D created at times $t'_1$, $t'_2$ and $t'_4$. Furthermore, the centroid of the spatial waveform created at time $t_3$ in FIG. 5B is the same as that created at time $t'_3$ in FIG. 2D. However, the spatial waveform created at time $t'_3$ in FIG. 2D is created by driving all eight electrodes 132a–132h while the spatial waveform created at time $t_3$ in FIG. 5B is created by driving only the four electrodes 132b, 132c, 132f and 132g.

As a result, the voltage waveform shown in FIG. 2E differs from the voltage waveform shown in FIG. 5C. The centroid of the positive portion of the composite spatial waveform shown in FIG. 2E is shifted −0.346 (=−4.5/13) from the reference point X. Thus, the centroid of the total spatial waveform is shifted to a position −0.346 from the reference point midway between the electrodes 132d and 132e. In contrast, the centroid of the composite spatial waveform shown in FIG. 5C is shifted −0.409 (=−4.5/11). Thus, the degree to which a shift in the position of an individual spatial waveform can shift the position of the composite spatial waveform depends not only upon the magnitude of the shift, but also the number of electrodes driven to create the spatial waveform, the "weighting" of the individual spatial waveform.

Figure 6:
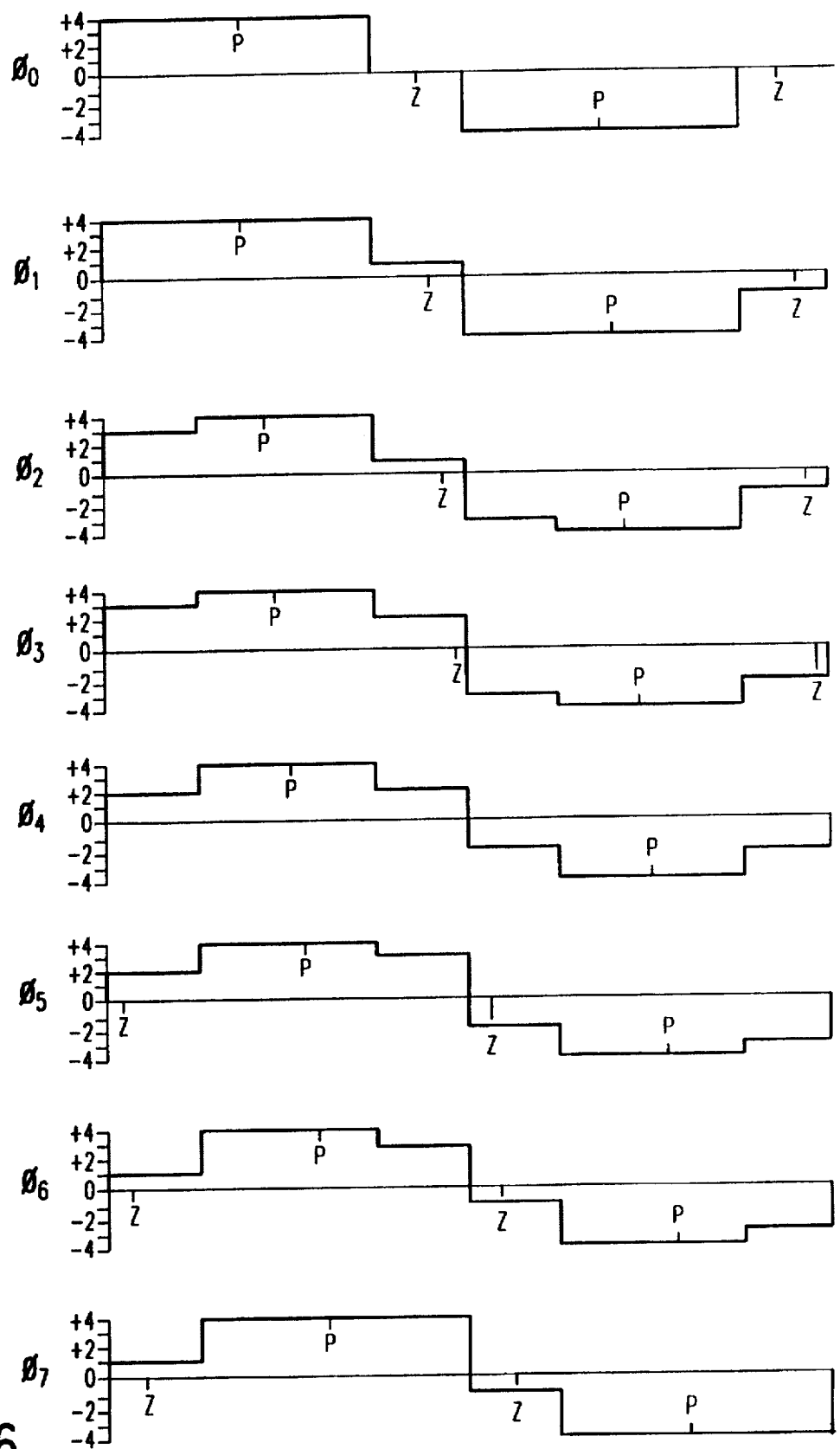
FIG. 6 illustrates how the resulting spatial waveforms define incremental positions within a single pitch of the electrodes of the capacitive position encoder of FIG. 1.

FIG. 6 shows a set of voltage waveforms used in the preferred embodiment of this invention. Each of the voltage waveforms is created by selectively applying either a positive or a negative voltage to each of the eight electrodes 132a–132h over four times $t_1$–$t_4$. As a result, the composite spatial waveform has composite amplitudes that are the composite of the four discrete voltage amplitudes in each of the four constituent digital spatial waveforms. The voltage amplitude of the composite spatial waveform extends between +4 units and −4 units in increments of one unit.

In the preferred embodiment illustrated in FIG. 6, the voltage signals are applied to the electrodes 130 to create eight different spatial waveforms $\phi_0$–$\phi_7$. The centroid P of each resulting composite spatial waveform is shifted to the right from the −0.5 $P_t$ position shown in waveform $\phi_0$ of FIG. 6 to the +0.346 $P_t$ position shown in waveform $\phi_7$ of FIG. 6, when the 0.00$P_t$ position corresponds to the left edge of an electrode.

Table 1 shows the calculation for determining these centroid shifts from the left edge of the electrode, where $P_t$ represents the width of the pitch 136 of the electrodes 130. In particular, Table 1 shows the incremental shifts of the centroid for the positive portion, and thus the entire waveform, for each waveform $\phi_0$–$\phi_7$ when the composite waveform is positioned relative to a first transmitter electrode 130. That is, the leftmost electrode of the waveform need not be the first electrode 132a or 134a of the first or second set 132 or 134. Rather, the leftmost electrode of the waveforms shown in FIG. 6 can be any one of the electrodes 132a–132h or 134a–134h.

TABLE 1

| |
| --- |
| ((−1.5) (4) + (−.5) (4) + (.5) (4) + (1.5) (0))/12 = −.500 $P_t$ |
| ((−1.5) (4) + (−.5) (4) + (.5) (4) + (1.5) (1))/13 = −.346 $P_t$ |
| ((−1.5) (3) + (−.5) (4) + (.5) (4) + (1.5) (1))/12 = −.250 $P_t$ |
| ((−1.5) (3) + (−.5) (4) + (.5) (4) + (1.5) (2))/13 = −.115 $P_t$ |
| ((−1.5) (2) + (−.5) (4) + (.5) (4) + (1.5) (2))/12 = .000 $P_t$ |
| ((−1.5) (2) + (−.5) (4) + (.5) (4) + (1.5) (3))/13 = .115 $P_t$ |
| ((−1.5) (1) + (−.5) (4) + (.5) (4) + (1.5) (3))/12 = .250 $P_t$ |
| ((−1.5) (1) + (−.5) (4) + (.5) (4) + (1.5) (4))/13 = .346 $P_t$ |

However, it should be understood that different constituent spatial waveforms can be used to produce other composite spatial waveforms which provide more or fewer increments in the position of the composite spatial waveform within a pitch 136 of the electrodes 130. For example, a composite spatial waveform having voltage unit amplitudes of 3, 4, 4, 0, −3, −4, −4, 0 would have a centroid of −0.409 $P_t$, which is between the centroid of −0.5 $P_t$ for the waveform $\phi_0$ and −0.346 $P_t$ for the waveform $\phi_1$.

The above-outlined example has been simplified, by using linear transfer functions for the transducer 100, in order to make this example more easily understandable. It should be appreciated that the preferred embodiment of this invention, the transducer 100 has a sinusodial signal transfer function. Thus, the calculation of the centroid becomes more mathematical.

With sinusodial transfer functions, the centroid is most simply calculated using vector calculus. When the composite amplitude for each phase electrode is $A_0$–$A_7$ respectively, the composite vector $V_T$ is:

$$V_T = \sum_{n=0}^{N} V_n$$

where $V_n$ is the vector for each phase n. For a 8-phase system, the amplitude and angle for the composite vector $V_T$ is calculated by:

$Re(V_T) = (A_0 + A_3 - A_4 - A_7) \cdot \cos 67.5° + (A_1 + A_2 - A_5 - A_6) \cdot \cos 22.5$
$Im(V_T) = (A_0 - A_3 - A_4 + A_7) \cdot \sin 67.5° + (A_1 - A_2 - A_5 + A_6) \cdot \sin 22.5$ $$\text{Amplitude}(V_T) = \sqrt{[(Re(V_T)]^2 + [(Im(V_T)]^2}$$

$$\text{Angle}(V_T) = \arctan \frac{Im(V_T)}{Re(V_T)}$$

Table 2 shows the amplitude and angle for the composite vector $V_T$ calculated using these equations. The constituent vectors are selected for best amplitude and angle accuracy in an even distribution of 8 artificial phase positions for each physical phase positions.

TABLE 2

| Nominal position | Phase # | | | | | | | | Amplitude relative | Angle degrees | Calculated position | Position error |
| --- | --- | --- | --- | --- | --- | --- | --- | --- | --- | --- | --- | --- |
| | 0 | 1 | 2 | 3 | 4 | 5 | 6 | 7 | | | | |
| 0.500 | 4 | 4 | 4 | 0 | −4 | −4 | −4 | 0 | 1.03 | 22.5 | 0.500 | 0.000 |
| 0.375 | 4 | 4 | 4 | 1 | −4 | −4 | −4 | −1 | 1.04 | 16.59 | 0.369 | −0.006 |

TABLE 2-continued

| Nominal position | Phase # | | | | | | | | Amplitude relative | Angle degrees | Calculated position | Position error |
|---|---|---|---|---|---|---|---|---|---|---|---|---|
| | 0 | 1 | 2 | 3 | 4 | 5 | 6 | 7 | | | | |
| 0.250 | 3 | 4 | 4 | 1 | −3 | −4 | −4 | −1 | 0.97 | 11.7 | 0.260 | 0.010 |
| 0.125 | 3 | 4 | 4 | 2 | −3 | −4 | −4 | −2 | 1.00 | 5.67 | 0.126 | 0.001 |
| 0.000 | 2 | 4 | 4 | 2 | −2 | −4 | −4 | −2 | 0.95 | 0 | 0.000 | 0.000 |
| −0.125 | 2 | 4 | 4 | 3 | −2 | −4 | −4 | −3 | 1.00 | −5.67 | −0.126 | −0.001 |
| −0.250 | 1 | 4 | 4 | 3 | −1 | −4 | −4 | −3 | 0.97 | −11.7 | −0.260 | −0.010 |
| −0.375 | 1 | 4 | 4 | 4 | −1 | −4 | −4 | −4 | 1.04 | −16.59 | −0.369 | 0.006 |

The nominal position steps are 1/8 of a physical phase step, i.e., 1/64 of a scale wavelength. The relative amplitude is the calculated amplitude, determined as outlined above, divided by the average amplitude for all the nominal positions in Table 2. As shown in Table 2, the amplitude of the composite vector $V_T$ stays within ±3% of average amplitude and the angular error relative to an even distribution of the artificial phase positions is never more than 1% of the phase interval, i.e., <1/800 of a wavelength.

It is important to understand how the pulses are coupled through the capacitive position transducer 100. As discussed above, the voltage pulses supplied to the transmitter electrodes 130 are capacitively coupled to the first receiver electrodes 140. The pulses are then conductively transmitted from the first receiver electrodes 140 to the second transmitter electrodes 150. From the second transmitter electrodes 150, the pulses are capacitively coupled to the second receiver electrode 160.

Since the electrodes are capacitively coupled, the only type of signal that can be coupled through the transducer 100 is a time varying signal. Thus, while a pulse signal, such as the pulse 200 shown in FIG. 7, can be coupled through the capacitive position transducer 100, a static voltage signal will not be coupled through the capacitive position transducer 100. The pulse 200 shown in FIG. 7 has a leading edge 202, a trailing edge 208 and a pulse voltage amplitude 204.

The amplitudes of the voltage signals were assumed to correspond to the amplitude 204 of the pulses 200 supplied by the signal generator 122 to the first transmitter electrodes 130. However, the pulse amplitude 204 corresponds to the height of the leading edge 202 or the trailing edge 206 since the amplitude 204 is equal to the length of the leading edge 202 or the trailing edge 206. Furthermore, the polarity (positive or negative) of the pulse amplitude 204 corresponds to the leading edge 202 being positive or negative.

Figure 7:
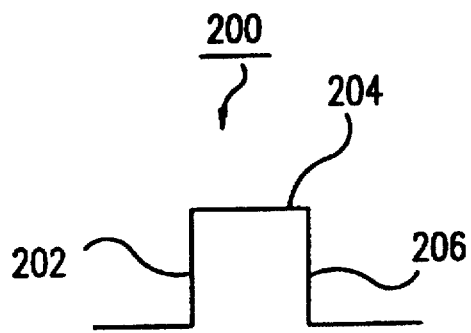
FIG. 7 illustrates a positive going pulse.
Figure 8:
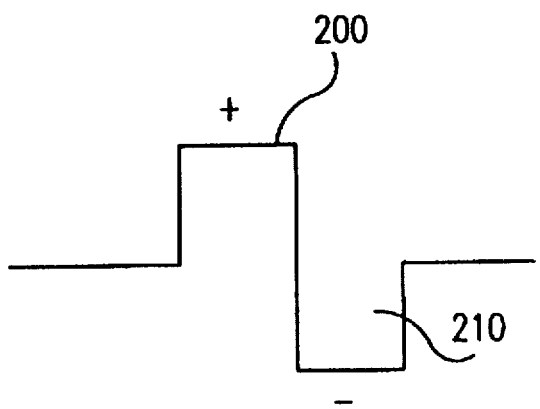
FIG. 8 illustrates a positive going pulse followed by a negative going pulse.

The positive pulse shown in FIG. 7 can be applied to any of the first transmitter electrodes 130. A positive pulse 200 immediately followed by a negative pulse 210, such as shown in FIG. 8, can also be applied to any of the electrodes 130. However, two adjacent pulses 200 or 210 can be coupled through the capacitive encoder only if the pulses are of different values or polarities, as shown in FIG. 8. If adjacent pulses 200 are of the same amplitude, the second pulse 200 will simply cause the voltage level to remain at the same pulse amplitude for another pulse cycle. Thus, there is no time varying component to be coupled through the capacitive encoder.

Figure 9:
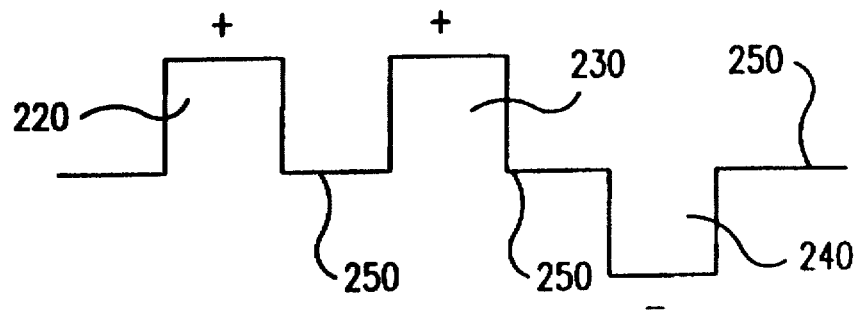
FIG. 9 illustrates pulses supplied to a conventional position encoder which must be separated from each other by a reset period.

Accordingly, the voltage signal supplied to the transmitter electrodes 130 must be "reset" before the next pulse is supplied, as shown in FIG. 9. In FIG. 9, each pulse 220, 230 and 240 is followed by a reset period 250. The duration of the reset period 250 necessarily reduces the speed at which measurements can be made, because a pulse 200 or 210 cannot be applied to a transmitter electrode 130 until after the expiration of the reset period 250.

However, detecting the magnitude and polarity of the pulses by detecting the magnitude and timing of the pulse transitions of the pulses 200 does not need the reset periods 250 to be inserted between the pulses 200.

Figure 10:
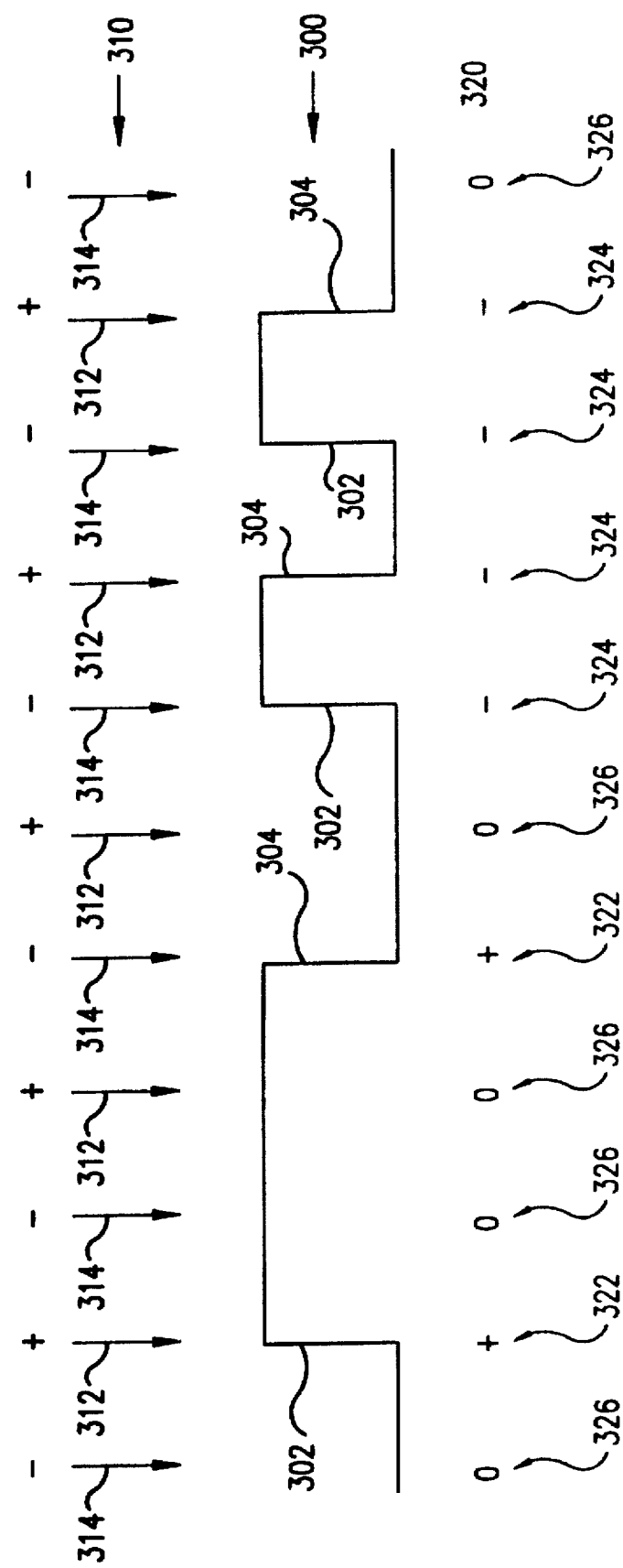
FIG. 10 shows a digital waveform with associated timing marks and data.

FIG. 10 shows a pulse train 300 beneath a plurality of equally spaced timing marks 310. The timing marks 310 are alternatively designated as positive ("+") timing marks 312 or negative ("+") timing marks 314. At each timing mark 310, the presence or absence of a pulse transition within the pulse train 300 is detected. A rising edge 302 which occurs at a positive timing mark 312 is defined as a positive pulse 322. Similarly, a falling edge 304 which occurs at a negative timing mark 314 is also defined as a positive pulse 322, since such a transition corresponds to the trailing edge of a positive pulse.

Conversely, a rising edge 302 which occurs a negative timing mark 314 is defined as a negative pulse 324, since the positive going transition corresponds to the trailing edge of a negative pulse. A falling edge 304 which occurs at a positive timing mark 312 is similarly defined as a negative pulse 324, since such a transition corresponds to the leading edge of a negative pulse. Finally, the absence of a pulse transition at any timing mark 310 is defined as a null pulse 326, the absence of either a positive or negative pulse. Thus, the pulse train 300 shown in FIG. 10 is decoded as the effective pulse train 320 shown in FIG. 10.

Defining the absence of a pulse transition as a null pulse, the absence of either a positive or negative going pulse, is a very useful addition to the digital type encoder system. In a digital system with only two possible voltage amplitude levels, the use of the null pulse as a possible input allows for three possible logic inputs using only two voltage levels: a rising edge, a falling edge or a null pulse. This alone allows the resolution of a normal digital type system to be doubled from the usual full pitch increments to half-pitch increments.

Figure 11:
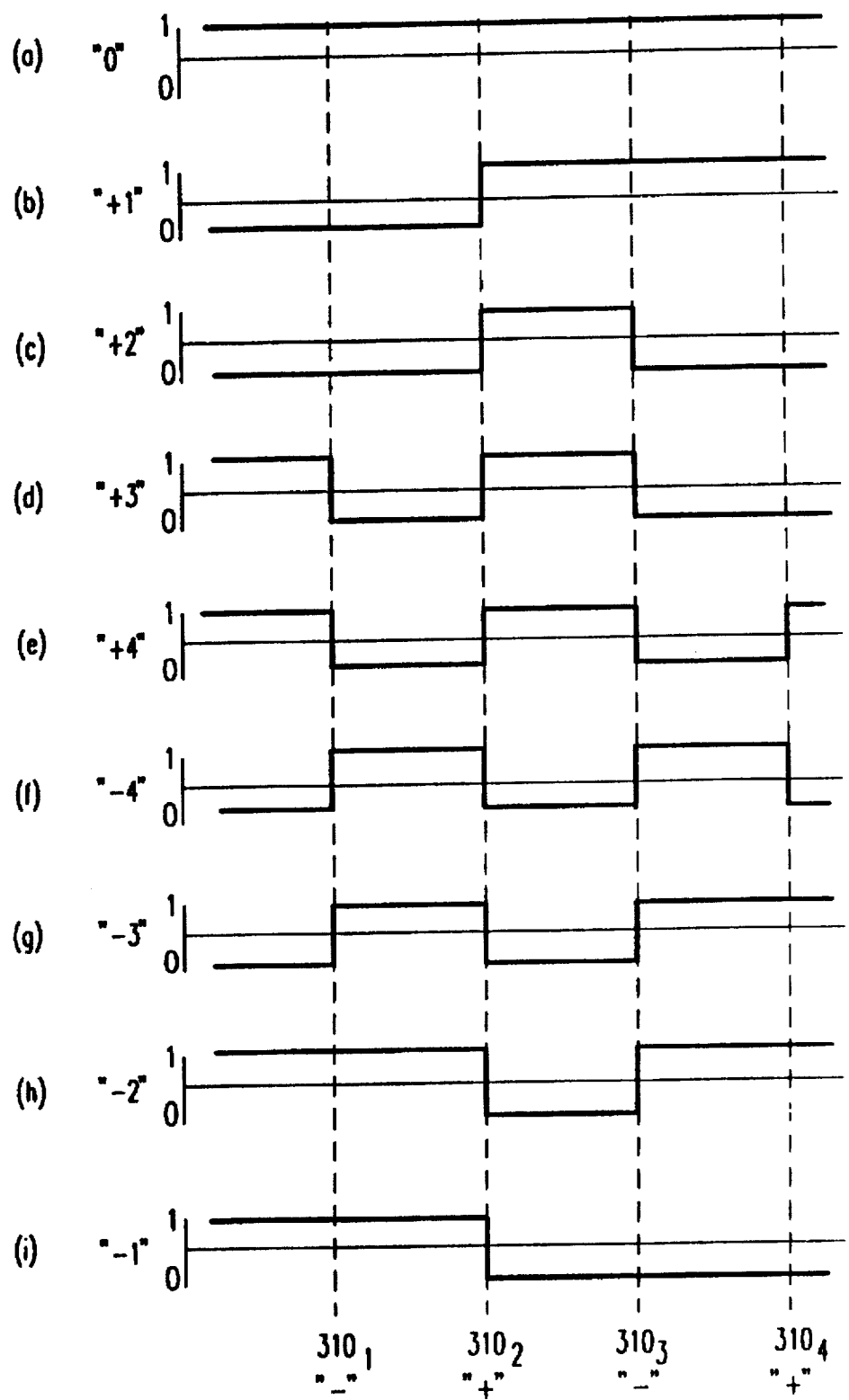
FIG. 11 illustrates a set of digital waveforms for inputting various composite voltage levels through the electrodes of the capacitive position encoder of FIG. 1.

By detecting the direction and timing of the pulse transitions coupled through the position transducer, the reset period 250 illustrated in FIG. 9 is no longer needed. Thus, the measurements can be made at a relatively rapid rate As mentioned above, the composite waveforms in the preferred embodiment have amplitudes incremented by one unit between +4 units and −4 units. FIG. 11 shows one set of signals (a-i) that can be supplied to each of the transmitter electrodes 130 to provide a composite amplitude of between +4 units and −4 units in increments of one unit. As shown in FIG. 11, pulse transitions are generated at the timing marks $310_1$–$310_4$. The polarity of the timing marks $310_1$–$310_4$ are also shown in FIG. 11.

In particular, the timing marks $310_1$ and $310_3$ are negative timing marks 312. The timing marks $310_2$ and $310_4$ are positive timing marks 314. To better illustrate the transitions between the logic levels "0" and "1", a median line between these logic levels is also shown on each signal (a)–(i).

Signal (a) creates a composite amplitude of "0" by using a static voltage of logic level "1". A composite amplitude of "0" can also be created by a static voltage of logic level "0". As shown in signal (b), a composite amplitude of "+1" is created by a rising edge at the positive timing mark $310_2$. The same composite amplitude could also be created by a rising edge at the positive timing mark $310_4$ or a falling edge at either of the negative timing marks $310_1$ or $310_3$.

As shown in signal (c), a composite amplitude of "+2" is created by a rising edge at the positive timing mark $310_2$ and a falling edge at the negative timing mark $310_3$. The same composite amplitude can be created with other pulse transitions occurring at different times. For example, any combination of a falling edge at one of the negative timing marks $310_1$ or $310_3$ and a rising edge at one of the positive timing marks $310_2$ or $310_4$ creates a composite amplitude of "+2".

As shown in signal (d), a composite amplitude of "+3" is created by a falling edge at the negative timing marks $310_1$ and $310_3$ and a rising edge at positive timing mark $310_2$. Finally, as shown in signal (e), a composite pulse amplitude of "+4" is created by rising edges at the positive timing marks $310_2$ and $310_3$ and falling edges at the negative timing marks $310_1$ and $310_3$. Negative composite amplitudes between −1 and −4 can be created in a similar manner, as shown in signals (f)–(i) of FIG. 11. Thus, for example, placing a composite voltage amplitude of −3 on electrode 132a during the measurement period extending over the timing marks $310_1$–$310_4$ requires supplying a rising edge of a pulse to the electrode 132a at the negative timing marks $310_1$ and $310_3$, and supplying a falling edge of a pulse to the electrode 132a at the positive timing mark $310_2$.

The coupling of each of the pulse transitions through the capacitive position transducer 100 of FIG. 1 is accumulated by detection circuits in the electronic circuit 120. The four pulse transitions shown in FIG. 11 necessary to create a "+4" composite amplitude do not actually place an amplitude of four units on any of the transmitter electrodes 130. The accumulated effect of the four pulse transitions at the detection circuit is the same as if a pulse having an amplitude of "+4" units was placed on a transmitter electrode 130.

Figure 12:
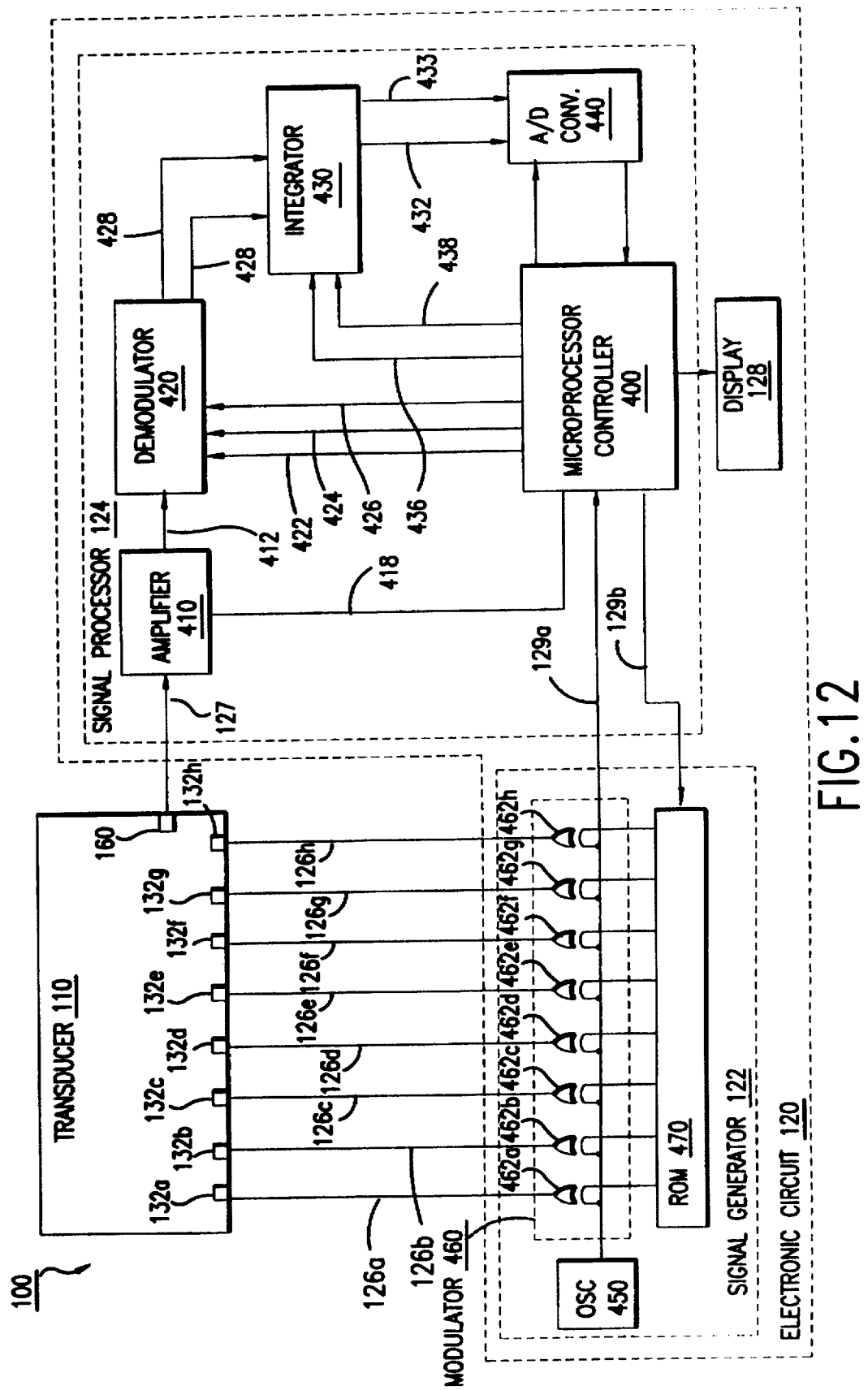
FIG. 12 shows the signal generator and signal processor of the capacitive position encoder of FIG. 1 in greater detail.

FIG. 12 shows one embodiment of the electronic circuit 120 used in the capacitive position transducer 100 shown in FIG. 1. For clarity, only the connections to the first set 132 of the first transmitter electrodes 130 and the second receiver electrode 160 are shown. Identical connections will be provided for each set 134 etc. of the transmitter electrodes provided.

The signals applied to the first transmitter electrodes 132a–132h are generated by the signal generator 122. The signal generator 122 includes an oscillator 450 which generates and outputs clock pulses to a set of exclusive OR gates 462a–462h of a modulator 460. The outputs of the exclusive OR gates 462a–462h are connected to the signal lines 126a–126h, respectively. The signal lines 126a–126h supply the outputs of the exclusive OR gates 462a–462h to the electrodes 132a–132h, respectively, of the first set 132.

The exclusive OR gates 462a–462h are individually enabled by data stored in a read-only memory (ROM) 470. The ROM 470 contains a lookup table which stores coefficients corresponding to the signals (a)–(i) shown in FIG. 11. The coefficients stored in the ROM 470 thus modulate the pulses from the oscillator 450 to form one of the signals (a)–(i) on each of the signal lines 126a–126h. In combination, the signals (a)–(i) generate the nine different composite amplitudes on the electrodes 130 to create the composite spatial waveforms for each of the positions shown in FIG. 6.

The addresses for the ROM 470 are generated by a microprocessor 400. The microprocessor 400 is also connected to the output of the oscillator 450. Thus, the microprocessor 400 can determine the timing and polarity of the oscillation signal to appropriately select an input to each of the exclusive OR gates 462a–462h.

The second receiver electrode 160 of the transducer 110 is connected by the signal line 127 to an amplifier 410 of the signal processor 124. The amplifier 410, which also receives a control signal from the microprocessor 400 on a signal line 418, amplifies the signal received from the second receiver electrode 160. The amplified signal is then output from the amplifier to a demodulator 420. The demodulator 420 is controlled by three control signals output from the microprocessor 400 on the signal lines 422, 424 and 426.

The demodulated signals are output to an integrator 430, which is controlled by two signals from the microprocessor 400 on the signal lines 436 and 438. The integrator 430 integrates the waveform received by the second receiver electrode over each set of four timing marks $310_1$–$310_4$. The analog signal output by the integrator 430 on either the signal line 432 or the signal line 433 is converted to a digital signal by the A/D converter 440. The digital signal output by the A/D converter 440 is then input by the microprocessor 400.

Each address of the ROM 470 contains a set of coefficients. Each coefficient corresponds to the existence and polarity of one logic level transition of one of the signals (a)–(i) of FIG. 11 for one timing mark 310. Furthermore, the ROM 470 contains sets of coefficients, that, in combination, are able to form each of the signals (a)–(i) shown in FIG. 11 to generate each phase or position $\phi_{0-7}$ of the spatial waveform shown in FIG. 6.

Thus, for example, the microprocessor 400 forms a composite amplitude level of +3 units on the first transmitter electrode 132a by selecting ROM addresses having the appropriate coefficients for the exclusive OR gate 462a so that the output of the exclusive OR gate 462a has a falling edge at the timing marks $310_1$ and $310_3$ and a rising edge at the timing mark $310_2$ and a null pulse (no transition) at the timing mark $310_4$. The first transmitter electrode 132a thus receives a composite voltage level of +3.

In the same manner, ROM addresses selected by the microprocessor 400 also have the appropriate coefficients for the exclusive OR gates 462b–462h so that composite amplitudes of +4 units are placed on electrodes 132b and 132c, +1 unit is placed on electrode 132d, −3 units are placed on electrode 132e, −4 units are placed on electrodes 132f and 132g, and −1 unit is placed on electrode 132h. By placing these amplitudes on the electrodes 132a–132h, the microprocessor 400 generates on the transducer 110 a spatial waveform having the phase or position $\phi_2$ shown in FIG. 6.

Therefore, the ROM 470 must store 32 8-bit words, where each bit corresponds to one of the electrodes 132a–132h. In addition, each address corresponds to whether or not there is a transition at one of the timing marks $310_1$–$310_4$ for each of eight different spatial phases or positions between two adjacent ones of the electrodes 130.

As explained above in reference to FIG. 1, the magnitude of the coupling to the first receiver electrodes 140 of the voltages supplied to the first transmitter electrodes 130 will vary depending upon the relative position between the slide 112 and scale 140. If the input waveforms are not altered, the voltage received by the second receiver electrode 160 will cycle through a full range of positive and negative voltages as the slide 112 moves relative to the scale 114 a distance equal to a full cycle or wavelength Wt of the array of the first transmitter electrodes 130. The magnitude of the voltage received by the second receiver electrode 160 is a function of the relative position between the slide 112 and the scale 114.

However, rather than measuring the full range of the voltage of the signal coupled to the second receiver electrode 160, which requires expensive, highly accurate analog-to-digital converters, the measurement system of the capacitive position encoder 100 of this invention adjusts the phase or position of the spatial waveform supplied to the first transmitter electrodes 130 to maintain the voltage coupled to the second receiver electrode 160 at close to 0 volts. Any residual voltage other than 0 volts can then be measured by the system using analog-to-digital converters with lower accuracy and range requirements than those required to measure the full voltage range.

By keeping track of the amount of phase shift of the spatial waveform required to maintain a null voltage signal on the second receiver electrode 160, the microprocessor 400 determines the position of the slide 112 relative to the scale 114 in predefined increments. The measurement system of the capacitive position encoder 100 of this invention performs this function with a resolution of less than the pitch 136 of the first transmitter electrodes 130 because it is able to shift the phase of the spatial waveform supplied to the electrodes 130 in eight increments within each pitch 136, as illustrated in FIG. 6. The microprocessor 400 increments or decrements the position of the spatial waveform based upon the polarity of the voltage output from the integrator 430 as indicated by the A/D converter 440. Also, of course, the measurement system of the capacitive position encoder 100 of this invention is able to determine the position of the slide 112 along the scale 114 in multiples of the pitch 136.

It should also be appreciated that the transducer structures and the methods described in the '013 patent can be used with the measurement system of the capacitive position encoder 100 described herein to reduce the increments over which the phase of the spatial waveform is shifted, thus increasing the resolution of the measurement system. However, care must be taken when combining the structures of the capacitive position encoder and methods described in the '013 patent with the measurement system described herein for all the reasons outlined in the '013 patent. Care must especially be taken with the order in which the electrodes of each set 132 and 134 are driven, for the reasons outlined in the '013 patent.

The output from the second receiver electrode 160 is connected through the signal line 127 to the amplifier 410. The amplitude of the output signal on the signal line 127 is the sum of the amplitude (including the polarity) of the input pulses output from the modulator 460 to the transducer 110 multiplied by the transfer function for the actual position, for each one of the phase channels.

$$S_{127}(t) = \sum_{n=0}^{N-1} V_n(t) \cdot T_n(x)$$

where $V_n(t)$ is the input amplitude of the pulses for the phase channel n at time t, $T_n(x)$ is the transfer function for the actual position x of the slide relative to the scale for the phase channel n, and $S_{127}(t)$ is the amplitude of the output signal on the signal line 127 at the time t.

The amplifier 410 is selectively controlled by the microprocessor 400 to amplify the signal from the second receiver electrode 160 during a period encompassing each rising or falling edge of the pulses output by the oscillator 450. The amplifier 410 is disabled between such edge transitions. The signal on the output line 412 of the amplifier 410 is a pulse generated each time pulse transitions supplied to the first transmitter electrodes 130 are coupled to the second receiver electrode 160. The polarity and amplitude of the pulse output from the amplifier 410 is proportional to the amplitude of the signal on the signal line 127 for each pulse transition.

The pulses output from the amplifier 410 are then input by the demodulator 420. As described above, the interpretation of polarity of the pulses is based not only the polarity of the transition but also the timing of the transition. The demodulator 420 thus generates a positive amplitude pulse on the output lines 422 in response to either rising edges on the pulses output by the amplifier 410 at the timing marks $310_2$ or $310_4$ or falling edges on the pulses output by the amplifier 410 at the timing marks $310_1$ or $310_3$. Conversely, the demodulator 420 generates negative amplitude pulses on the output lines 422 in response to either falling edges on the pulses output by the amplifier 410 at the timing marks $310_2$ or $310_4$ or rising edges on the pulses output by the amplifier 410 at the timing marks $310_1$ or $310_3$.

The pulses generated by the demodulator 420 are output to the integrator 430. The integrator 430 accumulates the pulses output from the demodulator 420 and outputs a signal to the analog-to-digital converter 440 corresponding to the sum of the pulse amplitudes output by the demodulator 420.

The magnitude and polarity of the voltage output by the integrator 430 is thus a measure of the offset between the phase or position of the composite spatial waveform applied to the transmitter electrodes 112 and the position of the second receiving electrode 114.

Based on the output value of the A/D converter 440, the microprocessor 400 determines the magnitude and direction in which the spatial waveform must be shifted to reduce the magnitude of the pulse transitions accumulated by the integrator 430. The microprocessor 400 records the position of the composite waveform and adds to this a correction determined from the output of the A/D converter 440. The microprocessor 400 also counts the wavelengths traversed to determine the position of the slide 112 relative to the scale 114.

The microprocessor 400 drives a conventional display 128 to provide a visual display of the determined position.

It should be noted that, although the signal processor 124 uses an analog-to-digital converter 440, the accuracy of the position measurements does not depend strongly upon the accuracy of the analog-to-digital converter (as in the prior art systems). The relative accuracy of the analog-to-digital converter 440 is not critical because the analog-to-digital converter 440 is used only to determine the magnitude and polarity of a residual voltage over a limited range rather than over the full range. When the residual voltage measurement is non-zero, the output of the analog-to-digital converter 440 is simply used to shift the position of the composite spatial waveform toward a null position. Thus, an expensive, highly accurate analog-to-digital converter 440 with a wide range, which otherwise would be needed to measure a full voltage range to the desired accuracy, need not be used in the signal processor 124.

For example, the wavelength of the transducer 110 is 5.12 mm and each set has 8 electrodes 130. If a resolution of 10 µm is required for the transducer 110, then 512 increments will need to be measurable over the wavelength of 5.12 mm. Since there are eight electrodes per wavelength, each pitch interval between adjacent electrodes must be divisible into 64 increments (512/8) by the A/D converter when using the prior art systems. To interpolate 64 increments within each pitch interval would require a 6-bit ($2^6$=64) A/D converter.

By applying the pulse interpolation and spatial waveform synthesizing methods and system described herein, each pitch interval is itself divided into eight sub-intervals by the operation of the spatial waveform synthesizing method and system. Thus, because there are 64 (8 pitches×8 intervals/pitch) intervals within each wavelength of the transducer, only 8 increments (512/64) within each interval need to be interpolated by the A/D converter. Thus, only a three-bit ($2^3$=8) A/D converter will be needed. Such a three-bit A/D converter uses significantly less power than higher-bit A/D converters. Thus, simplifying the A/D converter in this manner is especially valuable in digital calipers and the like, because these devices are powered by a single low voltage battery.

Figure 13:
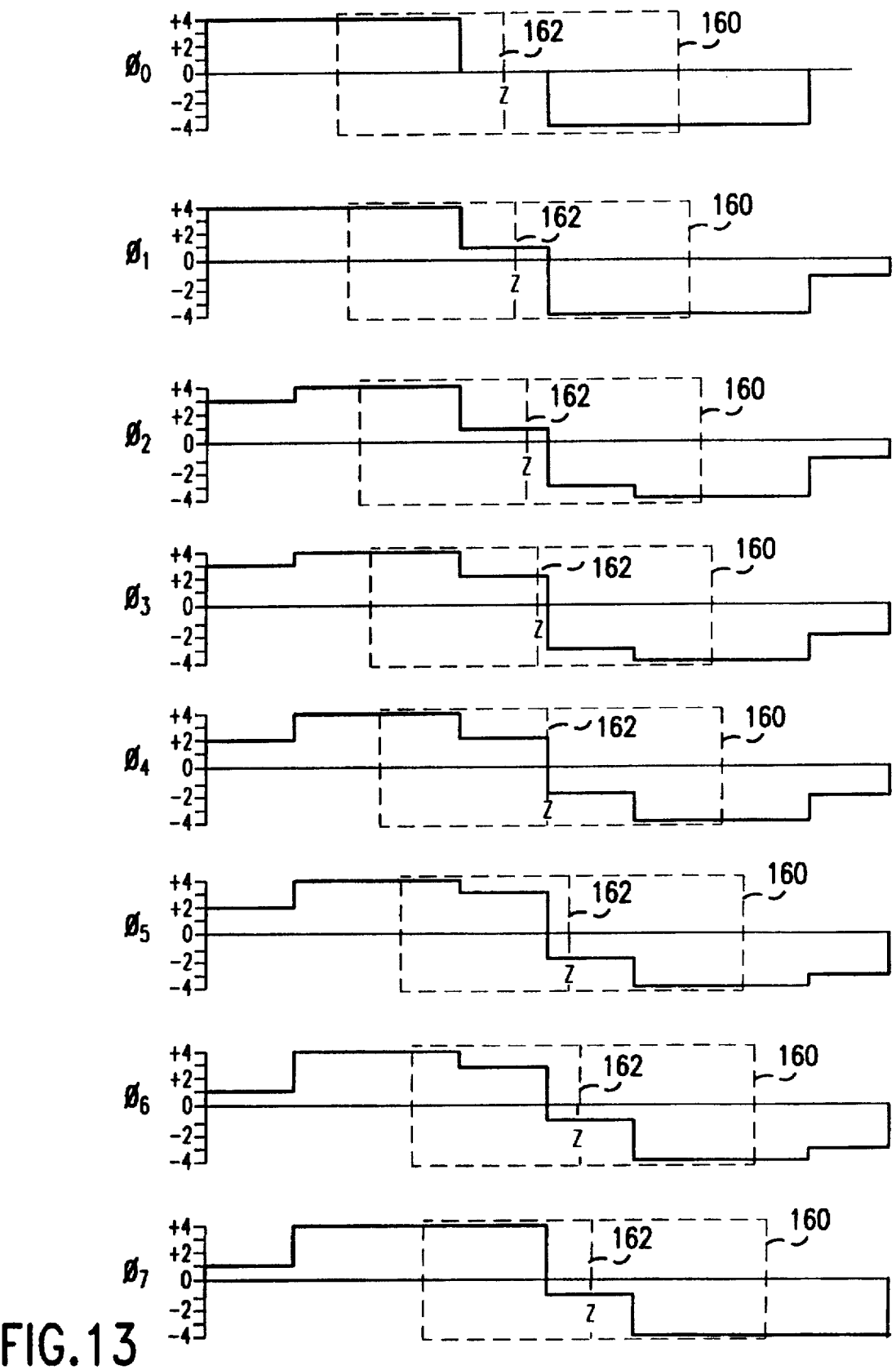
FIG. 13 illustrates how the spatial waveform is modified to define incremental positions within a pitch of the transmitter electrodes of the capacitive position encoder of FIG. 1 as the slide moves relative to the scale.

FIG. 13 shows the relationship between the phase of the composite spatial waveform supplied to the transmitter electrodes 130 and the position of the scale electrode 140. It should be appreciated that the shape of the electrodes 140 in FIG. 1 are half-sinusodial, while the shape of the electrodes shown in FIG. 13 is rectangular. For the following example, this approximation shown in FIG. 13 is sufficient.

In particular, FIG. 13 shows the composite voltage waveforms $\phi_0$–$\phi_7$ of FIG. 6. Superimposed on each of the composite voltage waveforms $\phi_0$–$\phi_7$ is a scale electrode 140, which is shown in the position necessary to obtain the null condition (i.e., zero pulse transitions coupled to it) for each of the eight composite waveforms $\phi_0$–$\phi_7$ As shown in the composite spatial waveform $\phi_0$ of FIG. 13, the accumulated pulse transitions coupled to the scale electrode 140 will be zero when the lateral center 162 of the scale electrode 140 coincides with the centroid Z, which is at the center of the center transmitting electrode 132$d$. If the slide 112 is then moved relative to the scale 114, the accumulated pulse transitions coupled to the scale electrode 140 will be positive or negative, depending upon the direction that the slide 112 has moved.

The microprocessor 400 will thus cause the signal generator 122 to shift the position of the centroid Z of the composite spatial waveform so that the centroid Z of the composite spatial waveform again coincides with the lateral center 162 of the scale electrode 140.

Thus, as shown in FIG. 13, as the slide 112 moves relative to the scale 114, the position of the composite spatial waveform must be shifted accordingly to maintain the centroid Z of the composite spatial waveform at the lateral center 162 of the scale electrode 140. As mentioned above, FIG. 13 illustrates this shift in the phase of the composite spatial waveform in eight increments, corresponding to the eight composite spatial waveforms $\phi_0$–$\phi_7$, covering a distance equal to the pitch 136 of the transmitter electrodes 130.

Figure 14:
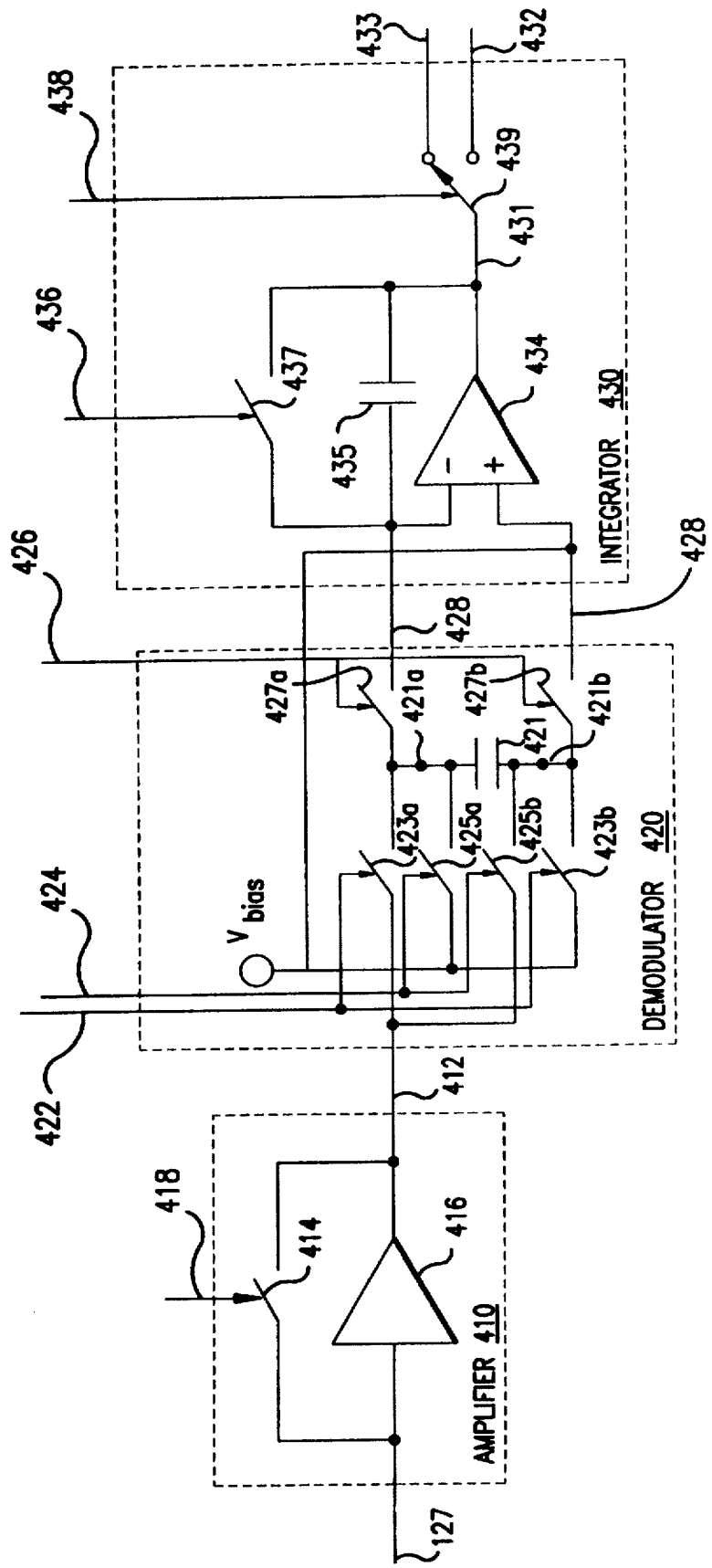
FIG. 14 shows a preferred embodiment of the amplifier, demodulator and integrator of the capacitive position encoder of FIG. 12.
Figure 15:
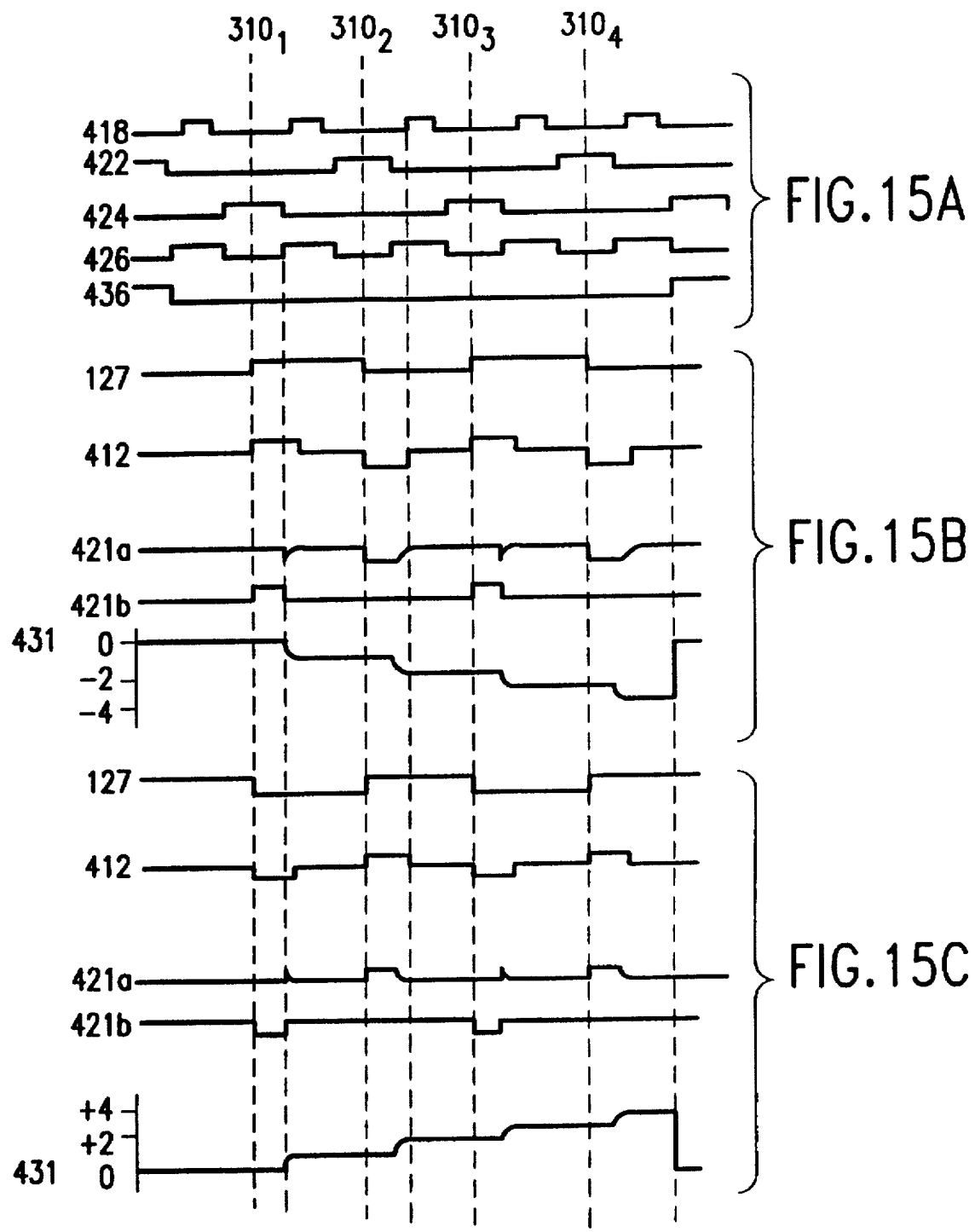
FIGS. 15A–15C show various waveforms present in the circuit of FIG. 14 under various conditions.

The amplifier 410, the demodulator 420 and the integrator 430 are shown in greater detail in FIG. 14. The operation of these elements is illustrated in FIGS. 15A–15C. As shown in FIG. 14, the pulse signal output from the transducer 110 on the signal line 127 is input to an amplifier 416 and a switch 414 of the amplifier 410. The amplifier 416 is a differential amplifier with a capacitor C providing a feedback impedance from the output to the inverting input terminal of the amplifier. As the output impedance of the transducer 112 at the terminal 127 is a capacitance with value $C_{127}$, the amplification will be equal to $C_{127}$/C. When switch 414 is closed, the amplification is zero and any DC leakage to the input terminal will be reset to zero (i.e., the input terminals are set to $V_{bias}$). The switch 414 is controlled by a signal output from the microprocessor 400 on the signal line 418. The switch 414 is closed when the signal on the signal line 418 is high.

The output of the amplifier 416 is input over the signal line 412 to a first switch 423$a$ and third switch 425$b$ of the demodulator 420. A second switch 425$a$ and a fourth switch 423$b$ are connected to a bias voltage $V_{bias}$. The first and fourth switches 423$a$ and 423$b$ are connected to the control line 422 from the microprocessor 400. Similarly, the second and third switches 425$a$ and 425$b$ are connected to the control line 424 from the microprocessor 400. The microprocessor 400 controls the switches 423$a$, 423$b$, 425$a$ and 425$b$ such that either the switches 423$a$ and 423$b$ are closed, or the switches 425$a$ and 425$b$ are closed, but both are not closed at the same time.

When the switches 423$a$ and 423$b$ are closed, the output of the amplifier 416 is connected to a node 421$a$ of a capacitor 421. The bias voltage $V_{bias}$ is connected to a node 421$b$ of the capacitor 421. This is the "non-inverting" connection to the capacitor 421. In contrast, when the switches 425$a$ and 425$b$ are closed, the output of the amplifier 416 is connected to the node 421$b$. The bias voltage $V_{bias}$ is connected to the node 421$a$. This is the "inverting" connection to the capacitor 421.

A pair of switches 427$a$ and 427$b$ connect the nodes 421$a$ and 421$b$ of the capacitor 421 over the signal lines 428 to the inverting and non-inverting inputs, respectively, of the operational amplifier 434 of the integrator 430. The switches 427$a$ and 427$b$ are connected to the control line 426 from the microprocessor 400. The switches 427$a$ and 427$b$ are closed when the signal on the control line 426 is high.

The signal line 431 is connected to the output of the operational amplifier 434. A capacitor 435 and a switch 437 are connected between the inverting input of the operational amplifier 434 and the signal line 432. The switch 437 is connected to the control line 436 from the microprocessor 400.

Various undesired manufacturing and operating conditions affect the transfer function levels of the capacitive position transducer 110. Thus, a reference signal should be used as a full scale reference value by the A/D converter 440. In this system, the reference signal is obtained during a separate referencing cycle. This cycle is run similarly to those described in reference to FIGS. 13, 14 and 15.

In particular, the centroid of the spatial waveform is shifted 90°. In addition, a reduced number of electrodes are driven and the output signal is integrated over a reduced number of cycles. This ensures that the amplitude of the reference signal is approximately equal to the anticipated voltage range needed to convert the measurement signal. The required accuracy of this reference signal is fairly low, due to the low resolution of the A/D converter 440.

Referring to FIG. 13, in each of the spatial waveforms $\phi_0$–$\phi_7$, if the spatial waveform were shifted to the right by two full electrodes 130 (equivalent to 90° shift), the scale electrode 140, that rather than receiving a signal close to zero, would receive a signal close to a maximum. This is what is done during the reference cycle. The relative meaning of the regular measuring cycle signal magnitude is unclear without this reference signal, since undesired manufacturing or operating parameters may affect the overall magnitudes of the signals produced by the system regardless of the actual position of the transducer 110.

Thus, the signal line 431 is controllably connected to the reference signal line 432 or the measurement signal line 433 by a switch 439. The switch 439 is connected to the control line 438 from the microprocessor 400. The reference signal line 432 carries the reference signal to the A/D converter 440 for setting up the A/D converter 440. Once the A/D converter 440 is set up, the measurement signal line 433 is used, and carries the measured signal to the A/D converter 440.

FIG. 15A shows the control signals output by the microprocessor 400 to the amplifier 410, the demodulator 420, and the integrator 430 over the control lines 418, 427, 424, 426 and 436. FIGS. 15B and 15C show the output signals from the amplifier 410, the voltages on the nodes 421a and 421b, and the output signal from the integrator 430 for two different output signals from the transducer 110.

As shown in FIG. 15A, the microprocessor 400 outputs a high voltage pulse on the signal line 418 to close the switch 414 for a short period preceding each timing mark $310_1$–$310_4$. This resets the amplifier 416. The microprocessor 400 outputs high voltage pulses on the signal line 422 to close the switches 423a and 423b during the timing marks $310_2$ and $310_4$ while leaving open the switches 423a and 423b during the timing marks $310_1$ and $310_3$. In contrast, the microprocessor 400 outputs high voltage pulses on the signal line 424 to close the switches 425a and 425b during the timing mark $310_1$ and $310_3$, while leaving open the switches 425a and 425b during the timing marks $310_2$ and $310_4$. The microprocessor finally outputs a pulse train on the signal line 426 such that the switches 427a and 427b are open whenever any of the switches 423a, 423b, 425a or 425b are closed and closed only when all of the switches 423a, 423b, 425a and 425b are open.

The microprocessor 400 also outputs a low voltage pulse on the signal line 436 to open the switch 437 of the integrator 430 from just before the timing mark $310_1$ until just after the timing mark $310_4$. Then, after the timing mark $310_4$ of the current measurement cycle, and before the timing marks $310_1$ of the next measurement cycle, the microprocessor 400 closes the switch 437 to reset the output of the operational amplifier 434.

As shown in FIG. 15B, a signal on the signal line 127 from the second receiving electrode 160 has falling edges at the timing marks $310_1$ and $310_3$ and rising edges at the timing marks $310_2$ and $310_4$. As outlined above, falling edges at the timing marks $310_1$ and $310_3$ and rising edges at the timing marks $310_2$ and $310_4$ are defined as positive pulse transitions. Thus, the signal shown on the signal line 127 in FIG. 15B corresponds to four positive pulses coupled through the capacitive position encoder 110.

The signal on the output 412 of the amplifier 416 goes low (for a short period) beginning at the timing mark $310_1$ as a result of the falling edge on the signal line 127 at the timing mark $310_1$. The amplifier 416 is then reset to a bias level when the switch 414 is closed by the high voltage pulse on the signal line 418. The signal on the output 412 of the amplifier 416 then goes high (for a short period) beginning at the timing mark $310_2$ as a result of the rising edge on the signal line 127 at the timing mark $310_2$. The amplifier 416 is once again reset to the bias level when the switch 414 is closed by the high voltage pulse on the signal line 418.

The signal on the output 412 again goes low beginning at the timing mark $310_3$ as a result of the falling edge on the signal line 127 at the timing mark $310_3$. The amplifier 416 is again reset to the bias level when the signal switch 414 is closed by the high voltage pulse on the signal line 418. The signal on the output 412 of the amplifier 416 again goes high beginning at the timing mark $310_4$ as a result of the rising edge on the signal line 127. Finally, the amplifier 416 is again reset to the bias level when the switch 414 is once again closed. The amplifier thus generates positive pulses on the signal line 412 from the rising edges on the signal line 127 at the timing marks $310_2$ and $310_4$, and negative pulses on the signal line 412 from the falling edges on the signal line 127 at the timing mark $310_1$ and $310_3$.

Next, as shown in FIG. 15A, the switches 423a and 423b are closed during the periods which encompass the timing marks $310_2$ and $310_4$. Thus, the output line 412 and the bias voltage $V_{bias}$ are connected to the capacitor 421 in the non-inverted polarity. Similarly, the switches 425a and 425b are closed during the periods which encompass the timing marks $310_1$ and $310_3$. Thus, the output line 412 and the bias voltage $V_{bias}$ are connected to the capacitor 421 in the inverted polarity.

Accordingly, as shown in FIG. 15B, at the timing marks $310_1$ and $310_3$, the negative pulses on the signal line 412 are input to the capacitor 421 in the inverted polarity. The signals appear on the nodes 421a and 421b as shown in FIG. 15B. That is, at timing marks $310_1$ and $310_3$, the signal on the signal line 424 goes high, so that the voltage on the node 421a is connected to the bias voltage $V_{bias}$ through the closed switch 425a, while the negative pulse from the signal line 412 is connected to the node 421b by the closed switch 425b. The signal on the signal line 424 then goes low, opening the switches 425a and 425b.

Next, the switch 427b is closed by the high signal on the signal line 426 to connect node 421b to the reference voltage (i.e., non-inverting input) of the operational amplifier 434 of the integrator 430. The switch 427a is also closed by the high signal on the signal line 426 to connect the node 421a to the inverting input of the operational amplifier 434. The non-inverting input of the operational amplifier 434 is also connected to the bias voltage $V_{bias}$. When the switches 427a and 427b are closed, the node 421b is thus immediately placed at the bias voltage $V_{bias}$. This causes the voltage on the node 421a to increase by the voltage previously placed across the capacitor 421.

As a result, the charge on the capacitor 421 is transferred to the capacitor 435 connected between the output line 431 and the inverting input of the operational amplifier 434. The operational amplifier 434 and the capacitor 435 operate as an integrator to accumulate the charge received from the capacitor 421. Thus, the output of the operational amplifier 434 on the signal line 431 incrementally decreases.

The positive pulses on the signal line 412 at the timing marks $310_2$ and $310_4$ in FIG. 15B are processed by the demodulator 420 and the integrator 430 in a slightly different manner. As shown in FIG. 15B, at the timing marks $310_2$ and $310_4$, the positive pulses on the signal line 412 are input to the capacitor 421 in the non-inverted polarity. That is, at the timing marks $310_2$ and $310_4$, when the signal on the signal line 422 goes high, the voltage on the node 421b is connected to the bias voltage $V_{bias}$ through the closed switch 423b. The positive pulse from the signal line 412 is also connected to the node 421a by the closed switch 423a. The signal on the signal line 422 then goes low, opening the switches 423a and 423b.

Next, the switches 427a and 427b are again closed by a high signal on the signal line 426. This connects the node 421a to the inverting input of the operational amplifier 434 and the node 421b to the non-inverting input of the operational amplifier 434 (and reconnects the node 421b to the bias voltage $V_{bias}$). Since the voltage on the node 421b remains at the bias voltage $V_{bias}$, the voltage on the node 421a increases by the amplitude of the pulse on the signal line 412.

As a result, the charge now placed on the capacitor 421 is also transferred to the capacitor 435. Thus, the output of the operational amplifier 434 on the signal line 431 again incrementally decreases.

As a result, in FIG. 15B, the negative pulses occurring at the timing marks $310_1$ and $310_3$ and the positive pulses occurring at the timing marks $310_2$ and $310_4$ incrementally decrease the output of the inverting amplifier 434. Since the signal on the signal line 127 in FIG. 15B corresponds to four positive pulse transitions, the output of the inverting amplifier 434 on the signal line 431 decreases proportionally to the sum of those four pulses amplitudes. These amplitudes are therefore dependent on the input polarity and the transfer functions of the phase channels through which they are output. At the end of the measurement period, after the output from the integrator 430 has been processed by the A/D converter 440, the microprocessor 400 outputs a high signal on the signal line 436. This closes the switch 437 to discharge the capacitor 435 and to reset the integrator 430.

In FIG. 15C, the signal from the capacitive position transducer 110 on the signal line 127 is the inverse of the signal on the signal line 127 shown in FIG. 15B. Thus, the amplifier 410 generates positive pulses on the signal line 412 at the timing marks $310_1$ and $310_3$, and negative pulses on the signal line 412 at timing marks $310_2$ and $310_4$. In this case, the positive pulses at the timing marks $310_1$ and $310_3$ are input to the capacitor 421 in the inverted polarity since the switches 425a and 425b are closed at the timing marks $310_1$ and $310_3$.

Thereafter, when the switches 427a and 427b are closed by a high signal on the signal line 426, the node 421b is connected to the bias voltage $V_{bias}$. The voltage on the node 421a is thus reduced by the amplitude of the positive pulse on the signal line 412 stored in the capacitor 421. The negative charge on the capacitor 421 is then transferred to the capacitor 435 as described above. Thus, the output of the inverting amplifier 434 incrementally increases.

The negative pulses on the signal line 412 occurring at timing marks $310_2$ and $310_4$ are also input to the capacitor 421 as outlined above. As a result, when the switches 427a and 427b are closed, the charge on the capacitor 421 is transferred to the capacitor 435, causing the output of the inverting amplifier 435 to again incrementally increase.

In summary, the amplifier 410, the demodulator 420 and the integrator 430 provide an analog voltage to the A/D converter 440. This analog voltage has a magnitude and a polarity determined by the magnitude and the polarity of the pulse transitions output by the capacitive position encoder 110. The analog voltage thus indicates the magnitude and the polarity of the offset between the center of the receiver electrode 160 and the centroid of the composite spatial waveform, as illustrated in FIG. 13. The magnitude and the polarity of the signal received by the A/D converter 440 thus indicates the magnitude and the direction in which the composite spatial waveform supplied to the transmitter electrodes 130 must be shifted to move the centroid of the composite spatial waveform closer to the center 162 of the receiver electrode 160.

The position transducer 110 of FIG. 1 determines the position of the slide 112 relative to the scale 114 by keeping track of the incremental movement of the slide 112. The spatial waveform synthesizing method and apparatus of this invention may also be applied to the absolute capacitive position encoder disclosed in U.S. Pat. No. 5,023,559. Such absolute position encoders are similar to the incremental transducer shown in FIG. 1, except that two or more scales are provided. This invention is equally applicable to such transducers. All that is required to use this invention in such transducers is to provide the signal processor 124 with selection control logic. The selection control logic selects the scale to which the transducer signals will be applied, and from which the output signals will be read. Such selection control logic is known to those skilled in the art, and thus will not be further described.

In the above outlined description of the measuring system of the capacitive position encoder 100 of this invention shown in FIG. 1, the first transmitter electrodes 130 receive signals creating a composite spatial waveform. The composite spatial waveform is coupled from the slide 112 to the scale 114 and back to at least one second receiver electrode 160 on the slide 114. The composite spatial waveform received by the at least one second receiver electrode 160 generates a voltage that indicates the relative position between the slide 112 and the scale 114. However, it should be appreciated that, as discussed in the '559 patent, capacitive position encoders can be operated in the "reverse" direction.

Figure 16:
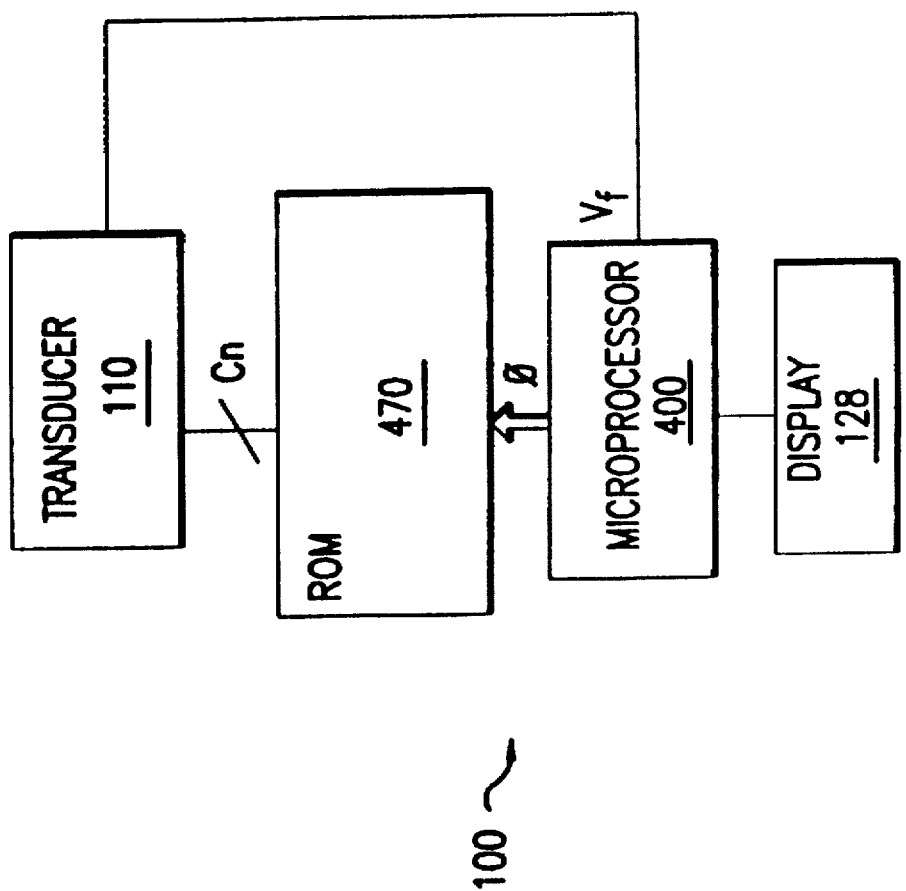
FIG. 16 is a block diagram of a generic structure for the signal generator and signal processor of the capacitive position encoder of FIG. 1.

FIG. 16 shows the measurement system of this invention in a form which is general to both the forward and reverse directions. As shown in FIG. 16, the microprocessor 400 receives a signal $V_f$ indicative of the phase shift of a spatial waveform as it is coupled through the position transducer 110. The microprocessor 400 then outputs an address to a ROM 470 to select the coefficients necessary to shift the composite spatial waveform to reduce the feedback voltage $V_f$ to zero. Based on the phase adjustment of the composite spatial waveform, the microprocessor 400 displays on the display 128 the position of the slide 112 relative to the scale 114. Further, the microprocessor 400 provides a plurality of addresses during each measurement cycle so that a phase shift of the composite spatial waveform is the average of the phase shift of each individual spatial waveform corresponding to each address output by the microprocessor 400.

Figure 17:
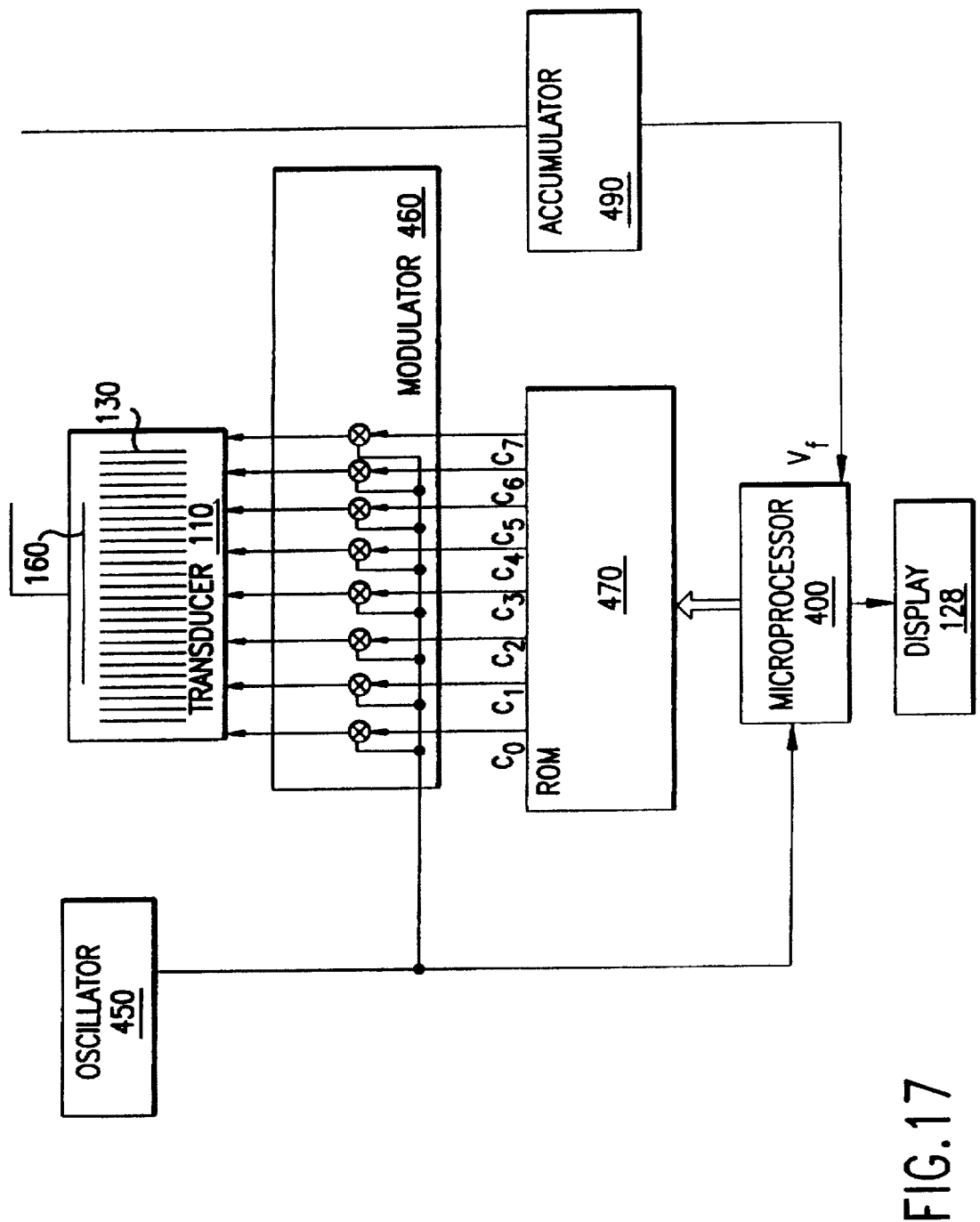
FIG. 17 is a block diagram of the signal generator and signal processor of the capacitive position encoder of FIG. 16.

For example, as shown in FIG. 17, the capacitive position transducer 110 receives signals representing a composite spatial waveform on the first transmitter electrodes 130 and outputs a voltage on the second receiver electrodes 160 indicative of the relative position between the slide 112 and the scale 114 of the capacitive position encoder 110.

The composite spatial waveform is generated by a set of exclusive OR gates 462 of a modulator 460. The exclusive OR gates 462 multiply the output of the oscillator 450 by the respective coefficients $C_0$–$C_7$ output from the ROM 470. Each set of coefficients $C_0$–$C_7$ stored at each address of the ROM 470 corresponds to a specific phase of an individual spatial waveform applied at one of the timing marks $310_1$–$310_4$. The exclusive OR gates 462 of the modulator 460 thus modulate the pulses from the oscillator 450 with the coefficients $C_0$–$C_7$ from the ROM 470.

As each of the spatial waveforms are supplied to the capacitive position transducer 110 at the timing marks $310_1$–$310_4$, the resulting voltage on the second receiver electrode 160 is accumulated in the accumulator 490. The accumulator 490 includes the amplifier 410, the demodulator 420, the integrator 430 and the A/D converter 440 of FIG. 12. At the end of the measurement cycle, a voltage $V_f$ output from the accumulator 490 indicates the magnitude and the direction of the shift necessary to position the composite spatial waveform to reduce the magnitude of $V_f$.

Figure 18:
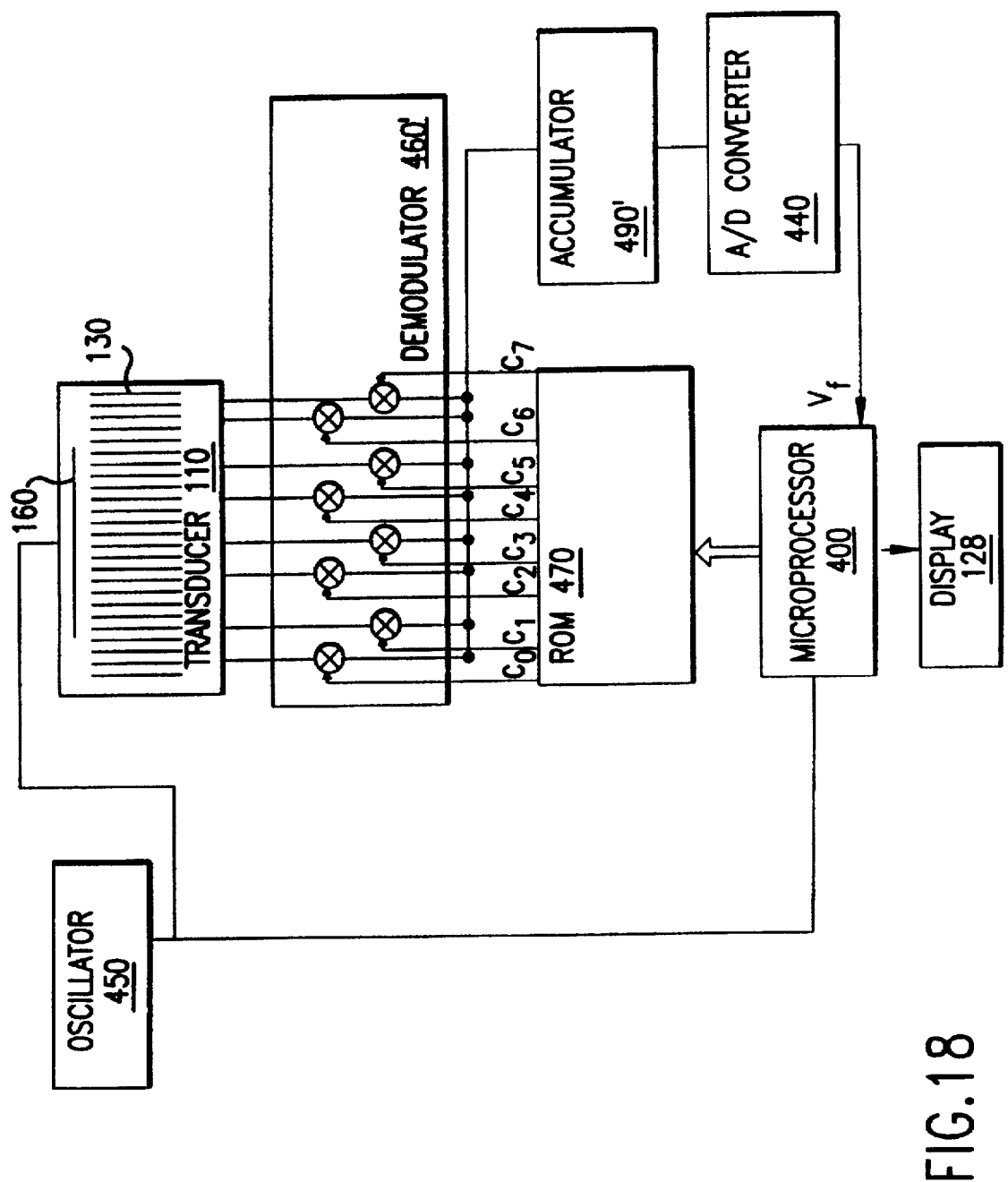
FIG. 18 is a block diagram of an alternative embodiment of the signal generator and signal processor of the capacitive position encoder of FIG. 16.

As mentioned above, the capacitive position transducer 110 may be driven in the reverse direction in substantially the same manner, as illustrated in FIG. 18. As shown in FIG. 18, the oscillator 450 outputs four pulses, one at each of the timing marks $310_1$–$310_4$ in the same manner as in FIG. 17. These pulses are applied to the second receiver electrode 160. The pulses are capacitvely coupled from the electrode 160 to electrodes 150, transferred to electrodes 140, and then capacitively coupled to electrodes 132a–132h (8 channels). Each of these eight transmission channels has a transfer function that depends upon the position of the slide 112 relative to the scale 114.

The signals are then received from the first transmitter electrodes 130 by a multiplier 460', which also receives a set of coefficients $C_0$–$C_7$ from the ROM 470. Each of the coefficients $C_0$–$C_7$ has a value of –1, 0, or +1. The coefficients $C_0$–$C_7$ adjust the phase position of a composite spatial filter by multiplying the signals received by the electrodes 130. This effectively spatially filters the sensitivity profile for the electrodes 130. The sum of the output charges from the eight channels from the multiplier 460' are then fed to the accumulator 490' to output a voltage at the end of the measurement period.

This voltage is then converted by the A/D converter 440 to a digital signal. The digital signal is used by the microprocessor 440 to determine the position of the scale 112 relative to the slide 114, as well as to select a new set of coefficients $C_0$–$C_7$ to be output from the ROM 470 to shift the phase of the composite spatial received by the electrodes 130.

In both FIGS. 17 and 18, the microprocessor 400 outputs a phase signal to the ROM 470 to output the coefficients $C_0$–$C_7$ that adjust the phase of the composite spatial transfer function so that the feedback voltage $V_f$ is minimized. Based upon the phase adjusting signal, the microprocessor 400 determines the position of the slide 112 relative to the scale 114.

The position transducer 110, the oscillator 450, and either the modulator 460 of FIG. 17 or the multiplier 460' of FIG. 18 form a transfer function device. The transfer function $T_f$ of the transfer function device outputs a voltage $V_f$ based on both the position of the slide 112 relative to the scale 114 and the phase of the composite spatial waveform corresponding to the set of addresses output by the microprocessor 400 during the measurement cycle. Further, the transfer function $T_f$ exists regardless of whether the electronic position encoder is the incremental capacitive position encoder 100 shown in FIG. 1, an absolute position encoder, or some other type of electronic position encoder. Moreover, the transfer function $T_f$ exists regardless of whether the capacitive position encoder 100 receives a spatial waveform on one or more of receiver electrodes or generates a spatial waveform on a plurality of transmitter electrodes. In each case, the microprocessor 400 outputs a plurality of addresses during each measurement so that the composite spatial waveform resulting from all of the phase signals occurring during a measurement cycle may be shifted in phase by increments that are less than the pitch of the transmitter electrodes 130.

It should be appreciated that the microprocessor 400 can be implemented using a programmed microprocessor or microcontroller (and peripheral integrated circuit elements), an ASIC or other integrated circuit, a hardwired electronic or logic circuit such as a discrete element circuit, a programmable logic device such as a PLD, PLA or PAL, or the like. It should also be appreciated that the ROM 470 is preferably implemented using a ROM. However, the ROM 470 can also be implemented using a PROM, and EPROM, an EEPROM, a flash memory, a hardwired logic circuit, or the like.

It should be appreciated that, although specific embodiments of the invention have been described herein for purposes of illustration, various modifications may be made without departing from the spirit and scope of this invention. It is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A system for measuring the relative position between first and second members, comprising:
   a capacitive position encoder, comprising:
      first and second substrates movable relative to each other along a measurement axis,
      an array of electrodes formed on the first substrate with voltages applied to the electrodes in the array corresponding to a spatial waveform,
      at least one other electrode formed on said first substrate, said other electrode capacitively coupled to said array of electrodes through said second substrate with the signal received from said other electrode based on a predetermined transfer function defining a coupling of the spatial waveform between said array of electrodes and each other electrode corresponding to the relative position between said first and second substrates along said measurement axis and the position and shape of said spatial waveform on said array of electrodes, and
      a spatial waveform shifter connected to said array of electrodes for shifting the position of a spatial waveform along said array by a distance corresponding to integer multiples of a predetermined distance as a function of a control signal so that the shift of said spatial waveform corresponds to the relative position between said first and second substrates along said measurement axis;
   a control system connected to the other electrode of said capacitive position encoder and to said spatial waveform shifter, said control system applying said control signal to said spatial waveform shifter for each position measurement, said control signal causing a plurality of spatial waveforms to be coupled through said spatial waveform shifter and said capacitive position encoder during each position measurement, with the shift of at least one spatial waveform through said spatial waveform shifter differing from the shift of at least one other spatial waveform through said spatial waveform shifter by integer multiples of said predetermined distance so that the average shift of said plurality of spatial waveforms coupled through said spatial waveform shifter is a fraction of said predetermined distance, said control system receiving a feedback signal from said capacitive position encoder corresponding to the average of the phase shifts of said plurality of spatial waveforms coupled through said spatial waveform shifter and said capacitive position encoder during each position measurement, said control system generating the control signal for a subsequent position measurement as a function of said feedback signal to reduce said feedback; and
   a position determining system receiving said control signal from said control system for determining the position of said first substrate relative to said second substrate as a function of said control signal.

2. The measuring system of claim 1, wherein said spatial waveform shifter applies respective voltages to the electrodes in said array, thereby applying a spatial waveform to said array, and wherein a respective voltage is generated at said other electrode as a result of each of said plurality of spatial waveforms applied to said array for each measurement.

3. The measuring system of claim 2, wherein said spatial waveform shifter comprises:
   a clock generating a plurality of pulses;
   a memory recording a plurality of sets of coefficients, each of said sets of coefficients corresponding to a respective shift of said spatial waveform by an integer multiple of the pitch of said array of electrodes, said memory being addressed by said control signal so that said control signal determines the set of coefficients being output by said memory;

a modulator receiving a plurality of pulses from said clock and a corresponding plurality of coefficients from said memory for each position measurement, said modulator applying respective voltages to the electrodes in said array for each of said pulses, said voltages forming a spatial waveform having a phase corresponding to said set of said coefficients.

4. The measuring system of claim 2, wherein said spatial waveform shifter comprises:

a clock generating a plurality of pulses;

a memory recording a plurality of sets of coefficients, each of said sets of coefficients corresponding to a respective shift of said spatial waveform by an integer multiple of the pitch of said array of electrodes, said memory being addressed by said control signal so that said control signal determines the set of coefficients being output by said memory;

a modulator receiving a plurality of pulses from said clock and a corresponding plurality of coefficients from said memory for each position measurement, said modulator applying respective voltages to the electrodes in said array for each of said pulses, said voltages forming a spatial waveform having a phase corresponding to said set of said coefficients, said modulator including a set of logic gates each of which receives the pulses from said clock and a respective coefficient from said memory, the outputs of said logic gates being connected to respective electrodes in said array.

5. The measuring system of claim 4, wherein said spatial waveform shifter comprises:

a memory recording a plurality of sets of coefficients, each of said sets of coefficients corresponding to a respective shift of said spatial waveform by an integer multiple of the pitch of said array of electrodes, said memory being addressed by said control signal so that said control signal determines the set of coefficients being output by said memory;

a demodulator receiving a plurality of spatial waveforms each corresponding to a set of voltages from the electrodes in said array and a corresponding plurality of sets of coefficients from said memory for each position measurement, said demodulator generating respective voltages from each of said spatial waveforms received from the electrodes in said array, each of said voltages having a value corresponding the phase of a respective spatial waveform received from said array and a respective set of said coefficients, said demodulator comprising a set of logic gates each of which receives a respective voltage from an electrode in said array and a respective coefficient from said memory, the outputs of said logic gates being combined to generate said feedback signal.

6. The measuring system of claim 4, wherein said spatial waveform shifter comprises:

a memory recording a plurality of sets of coefficients, each of said sets of coefficients corresponding to a respective shift of said spatial waveform by an integer multiple of the pitch of said array of electrodes, said memory being addressed by said control signal so that said control signal determines the set of coefficients being output by said memory;

a demodulator receiving a plurality of spatial waveforms each corresponding to a set of voltages from the electrodes in said array and a corresponding plurality of sets of coefficients from said memory for each position measurement, said demodulator generating respective voltages from each of said spatial waveforms received from the electrodes in said array, each of said voltages having a value corresponding to the phase of a respective spatial waveform received from said array and a respective set of said coefficients.

7. The measuring system of claim 1, wherein a plurality of pulses are sequentially applied said other electrode for each measurement, and wherein said spatial waveform shifter receives respective voltages from the electrodes in said array as a result of each of said plurality of pulses applied to said other electrode for each measurement.

8. The measuring system of claim 1 wherein said capacitive position encoder is an incremental capacitive position encoder.

9. The measuring system of claim 1 wherein said capacitive position encoder is an absolute capacitive position encoder.

10. The measuring system of claim 1, wherein said predetermined distance is the pitch of said electrode array so that the average shift of said plurality of spatial waveforms coupled through said spatial waveform shifter is a fraction of the pitch of said electrode array.

11. A capacitive position encoder measuring system, comprising:

a capacitive position encoder having first and second substrates movable relative to each other along a measurement axis, an array of electrodes formed on said first substrate with voltages on the electrodes in said array corresponding to a spatial waveform, and at least one other electrode formed on said first substrate, said other electrode being capacitively coupled to said array of electrodes through said second substrate with a phase corresponding to the relative position between said first and second substrates along said measurement axis;

a signal generator connected to said array of electrodes, said signal generator applying a plurality of sets of discrete voltages to respective electrodes in said array for each position measurement, the average of said voltages applied to said electrodes resulting in a spatial waveform having a position relative to said array selectable by a control signal, each of said sets of discrete voltages causing a respective output signal to be generated at said other electrode having a magnitude and polarity determined by the position of said spatial waveform relative to said array and the phase of the capacitive coupling of said spatial waveform from said array to said other electrode;

an accumulator connected to said other electrode, said accumulator generating a voltage indicative of the values of a plurality of said output signals generated during each measurement; and a processor connected to said signal generator and said accumulator, said processor applying a respective control signal to said signal generator for each set of said discrete voltages, said processor generating said control signals as a function of a voltage feedback signal generated during a previous measurement so that the position of the spatial waveform applied to said array moves in a direction causing a reduction in the magnitude of said voltage feedback signal generated during said previous measurement, said processor further determining from the voltage feedback signal the relative position between said first and second substrates along said measurement axis.

12. The measuring system of claim 11, wherein said signal generator comprises:

a clock generating a plurality of pulses;

a memory recording a plurality of sets of coefficients, each of said sets of coefficients corresponding to a respective set of said discrete voltages, said memory being addressed by said control signal so that said control signal determines the set of coefficients being output by said memory; and set of logic gates each of which receives the pulses from said clock and a respective coefficient from said memory, the outputs of said logic gates being connected to respective electrodes in said array.

13. The measuring system of claim 11, wherein said signal generator applies a digital waveform to each of the electrodes in said array during each measurement period, the polarity and timing of logic level transitions in each of said waveforms determining the polarity of each of said discrete voltages.

14. The measuring system of claim 11, wherein said signal generator applies a digital waveform to each of the electrodes in said array during each measurement period, the number, polarity, and timing of logic level transitions in each of said waveforms determining the magnitude and polarity of each component of said spatial waveform, and wherein said accumulator accumulates the number, timing, and polarity of said transitions after being coupled from said array to said other electrode and generates said voltage feedback signal as a function of the number, polarity, and timing of said transitions.

15. The measuring system of claim 11, wherein said signal generator applies a digital waveform to each of the electrodes in said array during each measurement period, the number, polarity, and timing of logic level transitions in each of said waveforms determining the magnitude and polarity of each component of said spatial waveform, and wherein said accumulator accumulates the number, polarity, and timing of said transitions after being coupled from said array to said other electrode, said accumulator including a demodulator generating a pulse for each transition, said pulse having a polarity determined by the polarity and timing of said transition, said accumulator further including an integrator summing said pulses and generating an integrator output corresponding thereto, said accumulator further including an analog-to-digital converter receiving said integrator output and applying a corresponding digital word to said processor.

16. A method of measuring the relative position between first and second substrates in a capacitive position encoder in which a phase shift of a composite spatial waveform through said encoder corresponds to a relative position between said first and second substrates along a measurement axis, said method comprising:

(a) coupling a plurality of signals to said encoder for each position measurement, each of said signals causing a respective spatial waveform to be coupled through said encoder, with said spatial waveforms together creating the composite spatial waveform, a phase of said composite waveform, after being coupled through said capacitive position encoder, corresponding to the average of the phases of said spatial waveforms and the phase shift of said composite waveform through said encoder;

(b) determining the phase shift of said composite spatial waveform after being coupled through said capacitive position encoder;

(c) adjusting the phase of the composite spatial waveform after being coupled through said capacitive position encoder toward a predetermined value by altering the phases of at least some of said spatial waveforms independently of the phase shift of said spatial waveform through said capacitive position encoder; and (d) determining the relative movement between said first and second substrates along a measurement axis as a function of the adjustment in the phase of said composite waveform; and (e) repeating steps (a)–(d) while recording the relative movement between said first and second substrates to provide an indication of the relative position between said first and second substrates along said measurement axis.

17. The method of claim 16, wherein:

said capacitive position encoder includes:

an array of electrodes formed on said first substrate with voltages on the electrodes in said array corresponding to a spatial waveform, and at least one other electrode formed on said first substrate, said other electrode capacitively coupled to said array of electrodes through said second substrate with the phase shift of said spatial waveform between said array of electrodes and said other electrode corresponding to the relative position between said first and second substrates along said measurement axis; and said coupling of a plurality of signals to said capacitive position encoder comprises applying a respective voltage to each electrode in said array for each spatial waveform so that, for each position measurement, a plurality of sets of voltages are applied to said array.

18. The method of claim 16, wherein:

said capacitive position encoder includes:

an array of electrodes formed on said first substrate with voltages on the electrodes in said array corresponding to a spatial waveform, and at least one other electrode formed on said first substrate, said other electrode capacitively coupled to said array of electrodes through said second substrate with the phase shift of said spatial waveform between said array of electrodes and said other electrode corresponding to the relative position between said first and second substrates along said measurement axis; and coupling of a plurality of signals to said capacitive position encoder comprises modulating a plurality of pulses with a corresponding plurality of sets of coefficients from said memory for each position measurement, each coefficient in said set corresponding to an electrode in said array so that a plurality of modulated pulses are applied to each of said electrodes for each of said measurements, each set of modulated pulses forming a spatial waveform having a phase corresponding to said set of said coefficients.

19. The method of claim 16, wherein:

said capacitive position encoder includes:

an array of electrodes formed on said first substrate with voltages on the electrodes in said array corresponding to a spatial waveform, and at least one other electrode formed on said first substrate, said other electrode capacitively coupled to said array of electrodes through said second substrate with the phase shift of said spatial waveform between said array of electrodes and said other electrode corresponding to the relative position between said first and second substrates along said measurement axis;

said coupling of a plurality of signals to said capacitive position encoder comprises applying a respective voltage to each electrode in said array for each spatial waveform so that for each position measurement a plurality of sets of voltages are applied to said array; and said adjusting of the phase of the composite spatial waveform comprises:
  determining an average of the values of respective signals coupled from said array to said other electrode for said sets of voltages applied to said array, and
  altering at least some of the voltages applied to said electrode in said array as a function of the average of the values coupled to said other electrode.

20. The method of claim 16, wherein:

said capacitive position encoder includes:
  an array of electrodes formed on said first substrate with voltages on the electrodes in said array corresponding to a spatial waveform, and
  at least one other electrode formed on said first substrate, said other electrode capacitively coupled to said array of electrodes through said second substrate with the phase shift of said spatial waveform between said array of electrodes and said other electrode corresponding to the relative position between said first and second substrates along said measurement axis; and said coupling a plurality of signals to said encoder comprises applying a respective voltage to each electrode in said array for each spatial waveform so that for each position measurement a plurality of sets of voltages are applied to said array, and wherein said step of determining the phase shift of said composite spatial waveform after being coupled through said capacitive position encoder comprises determining an average of the values of respective signals coupled from said array to said other electrode for said sets of voltages applied to said array.

\* \* \* \* \*